(12) United States Patent
Khromova et al.

(10) Patent No.: US 12,119,667 B2
(45) Date of Patent: Oct. 15, 2024

(54) ELECTRICAL RESONATORS

(71) Applicants: METABOARDS LTD, Oxford (GB); OXFORD UNIVERSITY INNOVATION LTD, Oxford (GB)

(72) Inventors: Irina Khromova, Oxford (GB); Christopher Stevens, Oxford (GB)

(73) Assignee: METABOARDS HOLDINGS LTD, Iver (GB)

( * ) Notice: Subject to any disclaimer, the term of this patent is extended or adjusted under 35 U.S.C. 154(b) by 27 days.

(21) Appl. No.: 17/775,848

(22) PCT Filed: Nov. 10, 2020

(86) PCT No.: PCT/GB2020/052853
§ 371 (c)(1),
(2) Date: May 10, 2022

(87) PCT Pub. No.: WO2021/094735
PCT Pub. Date: May 20, 2021

(65) Prior Publication Data
US 2022/0407359 A1    Dec. 22, 2022

(30) Foreign Application Priority Data
Nov. 11, 2019   (GB) ..................... 1916410

(51) Int. Cl.
*H02J 50/12*    (2016.01)
*H01F 27/28*    (2006.01)
*H02J 50/40*    (2016.01)

(52) U.S. Cl.
CPC .......... *H02J 50/12* (2016.02); *H01F 27/2804* (2013.01); *H02J 50/40* (2016.02)

(58) Field of Classification Search
CPC ....................................................... H02J 50/12
(Continued)

(56) References Cited

U.S. PATENT DOCUMENTS

| 2011/0050382 A1 | 3/2011 | Baarman et al. |
| 2012/0235636 A1* | 9/2012 | Partovi .................... H02J 50/80 320/108 |
| 2016/0035486 A1* | 2/2016 | Turki .................... H01F 27/006 307/104 |

FOREIGN PATENT DOCUMENTS

| CN | 104617684 A | 5/2015 |
| EP | 3352529 A1 | 7/2018 |

(Continued)

*Primary Examiner* — Joseph Chang
(74) *Attorney, Agent, or Firm* — Lando & Anastasi, LLP

(57) ABSTRACT

The present invention relates to an electrical resonator (10), and an array (30) comprising a plurality of the electrical resonators (10). The electrical resonator (10) comprises an inductor coil comprising at least one turn. The at least one turn comprises an outer turn defining an outer coil perimeter (14). The electrical resonator comprises at least one capacitor connected to the inductor coil. The outer coil perimeter (14) comprises four major edges (141). Each of the major edge (141) is substantially linear and arranged on a different edge of a quadrilateral. The outer coil perimeter (14) comprises four minor edges (142) connecting the major edges (141). The array (30) comprises a first plurality of the electrical resonators (10a) arranged in a first layer, and a second plurality of the electrical resonators (10b) arranged in a second layer on top of the first layer. The minor edge (142a) of each electrical resonator substantially abuts the minor edge (142b) of an adjacent electrical resonator in the same layer, and the first and second layer together define a quadrilateral array of the electrical resonators (30), with a centre of each inductor coil in the first layer coincident with the centre of a gap region between inductor coils in the second layer. A method of arranging a plurality of electrical resonators in an array is also disclosed.

16 Claims, 16 Drawing Sheets

(58) Field of Classification Search
USPC .......................................................... 307/104
See application file for complete search history.

(56) References Cited

FOREIGN PATENT DOCUMENTS

| | | |
|---|---|---|
| JP | 2000050534 A | 2/2000 |
| JP | 2011175311 A | 9/2011 |

\* cited by examiner

ELECTRICAL RESONATORS

CROSS-REFERENCE TO RELATED APPLICATIONS

This application is a U.S. National Stage Application and claims the benefit under 35 U.S.C. § 371 of PCT/GB2020/052853, titled ELECTRICAL RESONATORS, filed Nov. 10, 2020, which claims priority to United Kingdom Application No. GB 1916410.2, filed Nov. 11, 2019, which patent applications are all hereby incorporated herein by reference in their entireties for all purposes.

FIELD

The present invention relates to wireless power transfer. In particular, the present invention relates to wireless power transfer from an array of inductively-coupled electrical resonators to a receiver.

BACKGROUND

Arrays of inductive-coupled electrical resonators for wireless power transfer have been disclosed in several publications.

WO 2011/070352 A1 discloses a common communications device comprising an array of near-field coupled resonant elements, the elements each comprising a coupling portion comprising a loop portion with free ends, the device being provided in combination with a data transmission unit and a data reception unit, each unit having a coupling portion, the units being arranged to communicate with one another by means of the coupling portion of each unit and the common communications device, the coupling portion of the data transmission unit comprising a resonant element comprising a loop portion arranged to be near-field coupled to the loop portion of a first resonant element of the device, the coupling portion of the data reception unit comprising a resonant element comprising a loop portion arranged to be near-field coupled to the loop portion of a second resonant element of the device not being the first resonant element.

WO 2012/172371 A1 discloses a magneto-inductive waveguide comprising a plurality of resonant elements, the plurality of resonant elements including a first resonant element comprising a conductive loop broken by at least one capacitive gap, and a second resonant element comprising a conductive loop broken by at least one capacitive gap, the second resonant element for magneto-inductively coupling with the first resonant element; wherein the first resonant element and second resonant element are conductively coupled.

WO 2015/033168 A1 discloses a waveguide for carrying waves by inductive coupling comprises a plurality of resonant elements, the plurality of resonant elements including a first resonant element; a second resonant element; and a coupling section capacitively coupling the first and second resonant elements, wherein the coupling between the first and second elements produces a first pass-band and a second-pass band, different from the first pass-band, the first pass-band being associated with the resonance of the resonant elements and the second pass-band being associated with resonance of the coupling section.

WO 2017/158374 A1 discloses a re-configurable magnetoinductive waveguide, comprising a plurality of resonator cells, wherein each resonator cell comprises a primary resonator that is inductively coupled to a primary resonator of at least one other resonator cell, and wherein at least one of the plurality of resonator cells is a controllable cell which further comprises a control element, the control element having an active control component that is operable to adjust the impedance of the primary resonator of the controllable cell in response to a control signal; wherein: the control element comprises a secondary resonator, the secondary resonator is inductively coupled to the primary resonator, and the active control component is arranged to vary the electrical properties of the secondary resonator in response to the control signal.

WO 2018/229494 A1 discloses a method of configuring a metamaterial structure comprising a plurality of electrical resonators that support magnetoinductive waves. The method comprises: powering at least one of the electrical resonators with an alternating current at an excitation frequency, the at least one powered electrical resonator providing a source of magnetoinductive waves in the structure; adjusting parameters of the metamaterial structure to create constructive interference of one-two- or three-dimensional magnetoinductive waves at one or more target resonators of the electrical resonators, to improve power transfer from the at least one powered electrical resonator to the one or more target resonators.

In arrays of electrical resonators for power transfer, it may be desirable to have improved inductive coupling between the individual electrical resonators, particularly between nearest-neighbour electrical resonators as well as higher-order neighbouring electrical resonators. A resonator's first order nearest-neighbour resonator(s) may be defined as those with the highest magnitude of inductive coupling within the array. The second order nearest-neighbour resonator(s) are those with the second highest magnitude of inductive coupling. In a square array, first order nearest-neighbours are typically those sharing an edge, and second order nearest-neighbours are typically those sharing a vertex.

It is desirable for an array of electrical resonators (arranged in an xy plane) to be able to couple to a receiver with a coupling coefficient that has a weak dependency dependent on the xy position of the receiver above the array—in other words, it is desirable. for the array of electrical resonators to produce sufficient magnetic field for the receiver to pick up, regardless of its position above the array of electrical resonators; this can be realised by either producing uniform magnetic field everywhere above the array at all times or by dynamically controlling the magnetic field and produce a magnetic-field "hot spot" at a specific location corresponding to the receiver position.

It is desirable for the array to provide a less variable near-field profile of the H-field generated directly above the centres of and the edges of and the corners of the electrical resonators at distances comparable to (or smaller than) the dimensions of the electrical resonators.

It is desirable for the array to provide improved control of the individual electrical resonators in the array for power transmission.

SUMMARY

According to a first aspect of the invention, there is provided an electrical resonator for wireless power transfer. The electrical resonator comprises an inductor coil comprising at least one turn. The at least one turn comprises an outer turn defining an outer coil perimeter. The electrical resonator comprises at least one capacitor connected to the inductor coil. The electrical resonator comprises a geometry that allows a plurality of the electrical resonators to be arranged in an array, such that:

the array comprises a first plurality of electrical resonators arranged in a first layer, and a second plurality of resonators arranged in a second layer on top of the first layer;

a corner region of each electrical resonator substantially abuts a corner region of an adjacent electrical resonator in the same layer;

the first and second layer together define a quadrilateral array of the electrical resonators, with a centre of each inductor coil in the first layer coincident with the centre of a gap region between inductor coils in the second layer; and wherein the area of the gap region is less than an area bounded by the outer coil perimeter.

The at least one turn of the inductor coil may comprise a plurality of concentric turns.

The at least one capacitor may comprise one capacitor, or two or more capacitors, and/or a tuning network, or a combination thereof.

In a region where the corner region of the electrical resonator substantially abuts the corner region of the adjacent electrical resonator, the distance between a track of the outer turn of the electrical resonator and a track of the outer turn of the adjacent electrical resonator may be substantially similar to the distance between a first turn and an immediately adjacent turn of the electrical resonator.

In the region where the corner region of the electrical resonator substantially abuts the corner region of the adjacent electrical resonator, the distance between the track of the outer turn of the electrical resonator and the track of the outer turn of the adjacent electrical resonator may be between 0.05 mm and 0.5 mm.

The corner region may comprise a minor edge of the electrical resonator. The outer coil perimeter may comprise four major edges. The outer coil perimeter may comprise four minor edges connecting the major edges.

Optional features of the electrical resonator disclosed in another aspect of the invention may also be applicable to the electrical resonator of the present aspect of the invention.

According to a second aspect of the invention, there is provided an electrical resonator for wireless power transfer. The electrical resonator comprises an inductor coil comprising at least one turn. The at least one turn comprises an outer turn defining an outer coil perimeter. The electrical resonator comprises at least one capacitor connected to the inductor coil. The outer coil perimeter comprises four major edges.

Each of the major edge is substantially linear and arranged on a different edge of a quadrilateral. The outer coil perimeter comprises four minor edges connecting the major edges. The length of each major edge is greater than the length of each minor edge.

The at least one turn of the inductor coil may comprise a plurality of concentric turns.

The at least one capacitor may comprise one capacitor, or two or more capacitors, and/or a tuning network of capacitors.

The length of each major edge may be greater than $$\frac{1}{1+\sqrt{2}}$$

times the length of the corresponding edge of the quadrilateral.

An area of a polygon bounded by the outer coil perimeter may be less than an area of the quadrilateral.

An area of a polygon bounded by the outer coil perimeter may be greater than an area of the largest circle that fits entirely within the quadrilateral.

An area of a polygon bounded by the outer coil perimeter may be greater than an area of the largest regular octagon that fits entirely within the quadrilateral.

The quadrilateral may be at least one of: a square, a rectangle, a parallelogram, a rhombus, and a rhomboid.

In some embodiments in which the quadrilateral is a square, the distance between opposite major edges may define a coil diameter D, and the polygon bounded by the outer coil perimeter may define an area A. In some embodiments, $A<D^2$. In some embodiments, $$A > \frac{\pi D^2}{4}.$$

In some embodiments, $A>2(\sqrt{2}-1)D^2$.

In some embodiments, a perpendicular distance between a major edge and a line joining midpoints of the two minor edges adjacent to the major edge may define a midpoint depth M. The plurality of concentric turns may further comprise an inner turn defining an inner coil perimeter. The perpendicular distance from a midpoint of a major edge to a point on the inner coil perimeter may define an effective inductor width W. In some embodiments, $W \geq M$. In some embodiments, $$W \geq \frac{11M}{10}.$$

In some embodiments, $W \geq 2M$.

The maximum deviation in the mutual angle between any linear sections or tangents to curved sections of a major edge may be less than 10°, or less than 5°, or less than 2°, or less than 1°. In some embodiments, the major edge may be straight.

A distance between a midpoint of a major edge and a midpoint of an opposite major edge may define a resonator diameter D. In some embodiments, 10 mm≤D≤100 mm.

The plurality of concentric turns may further comprise an inner turn defining an inner coil perimeter. The area of the polygon bounded by the outer coil perimeter may be greater than the area of the polygon bounded by the inner perimeter by a factor of at least 1.1.

The resonant frequency of the electrical resonator may be between 6 and 7 MHz; or between 1 and 10 MHz; or between 100 and 300 kHz.

The inductor coil may comprise one or more series of tracks, which may extend between nodes on a printed circuit board. The printed circuit board may comprise a FR-4 substrate. The series of tracks may comprise a copper track.

A track width the inductor coil may be between 0.1 mm and 3 mm. A distance between a track of a first turn of the inductor coil and a track of an immediately adjacent turn of the inductor coil may be between 0.05 mm and 0.5 mm.

Each minor edge may comprise a curved portion.

The outer coil perimeter may comprise: an octagonal coil perimeter; a rounded-octagonal coil perimeter; a rounded-rectangular perimeter; a rounded-square coil perimeter; a rounded-quadrilateral perimeter; a rounded-parallelogrammatic perimeter; a truncated-circular perimeter; or a squircular perimeter.

The plurality of concentric turns may further comprise an inner turn defining an inner coil perimeter. The inner coil perimeter may comprise: an octagonal coil perimeter; a rounded-octagonal coil perimeter; a rounded-rectangular perimeter; a rounded-square coil perimeter; a rounded-quadrilateral perimeter; a rounded-parallelogrammatic perimeter; a truncated-circular perimeter; or a squircular perimeter.

The minor edges may be oriented at 45° to the major edges.

Each of the minor edges may be oriented at 45 degrees to each of the major edges connected thereto. Each of the four major edges may have a length in the range of 10 mm to 100 mm. The total distance between the edges of the tracks of the coil (or the coil diameter) may be 10 mm to 100 mm. Each of the four minor edges may have a length in the range of 5 mm to 50 mm.

The resonant frequency of the electrical resonator may be between 100-300 kHz (for example 125 kHz, 175 kHz) or may be between 1 MHz and 10 MHz (for example, approximately 6.78 MHz).

The wireless power transfer may comprise wireless power transfer from the electrical resonator to a receiver, wherein the receiver is inductively coupled to the electrical resonator. The coupling may be near-field coupling.

According to a third aspect of the invention, there is provided an array of electrical resonators for wireless power transfer, the array comprising electrical resonators according to an aspect of the invention.

The wireless power transfer may comprise wireless power transfer from one or more of the electrical resonators to a receiver, wherein the receiver is inductively coupled to the one or more of the electrical resonators. The coupling may be near-field coupling.

According to a fourth aspect of the invention, there is provided an array of electrical resonators for wirelessly transferring power to a receiver. Each of the electrical resonators comprises an inductor coil comprising at least one turn. The at least one turn comprises an outer turn defining an outer coil perimeter. Each of the electrical resonators comprises at least one capacitor connected to the inductor coil. The outer coil perimeter comprises four major edges. Each major edge is substantially linear and arranged on a different edge of a quadrilateral. The outer coil perimeter comprises four minor edges connecting the major edges. The array comprises a first plurality of the electrical resonators arranged in a first layer. The array comprises a second plurality of the electrical resonators arranged in a second layer on top of the first layer. The minor edge of each electrical resonator substantially abuts the minor edge of an adjacent electrical resonator in the same layer, and the first and second layer together define a quadrilateral array of the electrical resonators, with a centre of each inductor coil in the first layer coincident with the centre of a gap region between inductor coils in the second layer.

The at least one turn of the inductor coil may comprise a plurality of concentric turns.

The at least one capacitor may comprise one capacitor, or two or more capacitors, and/or a tuning network of capacitors.

In a region where the minor edge of the electrical resonator substantially abuts the minor edge of the adjacent electrical resonator, the distance between a track of the outer turn of the electrical resonator and a track of the outer turn of the adjacent electrical resonator may be substantially similar to the distance between a first turn and an immediately adjacent turn of the electrical resonator.

In the region where the minor edge of the electrical resonator substantially abuts the minor edge of the adjacent electrical resonator, the distance between the track of the outer turn of the electrical resonator and the track of the outer turn of the adjacent electrical resonator may be between 0.05 mm and 0.5 mm.

Each minor edge may be at 45 degrees to the adjacent major edges.

Each electrical resonator in the array may be according to an aspect of the invention.

Each major edge of each electrical resonator of the first plurality of the electrical resonators may be substantially parallel to each major edge of each electrical resonator of the second plurality of the electrical resonators.

Each minor edge of each electrical resonator of the first plurality of the electrical resonators may be substantially perpendicular to each minor edge of each electrical resonator of the second plurality of the electrical resonators.

The first and second major edges of each electrical resonator may be parallel. The first and second major edge may be separated by a first distance or coil diameter in a direction perpendicular to the first and second major edges. A first vertex may be defined at which the first major edge meets a minor edge of the first resonator. A second vertex may be defined where a third major edge of the first resonator meets the minor edge. The third major edge may be perpendicular to the first and second major edges. The first and second vertices may be separated by a second distance or overlap. The first major edge of the first resonator and a closest major edge of a second resonator in the second plurality of the electrical resonators in a direction perpendicular to the first major edge may be separated by a third distance or pitch. The pitch distance may also be defined as the distance between centres of first order nearest neighbour resonators, or the coil diameter minus the overlap.

The array may comprise a plurality of control elements equal to the number of electrical resonators, with each control element being coupled to a different resonator, for example through inductive, capacitive or direct electrical coupling.

Each control element may be configured to operate in a state in which the control element is resonant at the frequency of the resonator to which it is inductively coupled.

Each control element that is inductively coupled to a resonator of the first plurality of the electrical resonators may be inductively coupled to a first surface of the respective resonator, each control element that is inductively coupled to a resonator of the second plurality of the electrical resonators may be inductively coupled to a second surface of the respective resonator, and the first and second surfaces may oppose one another.

The first and second layer may together define a rectangular or a square array of the electrical resonators.

Each major edge of each electrical resonator of the first plurality of the electrical resonators may be substantially parallel to each major edge of each electrical resonator of the second plurality of the electrical resonators.

Each minor edge of each electrical resonator of the first plurality of the electrical resonators may be substantially perpendicular to each minor edge of each electrical resonator of the second plurality of the electrical resonators.

In some embodiments, a coil diameter may be defined by the distance between opposite major edges of each resonator. Each minor edge may be the same length and may be oriented at an angle of 45° to each of the major edges connected thereto. An overlap may be defined by a component of the length of a minor edge in the direction of a connected major edge. A pitch may defined by the coil diameter minus the overlap.

In some embodiments, at least some of the electrical resonators may comprise a control element. The control element may comprise a secondary resonator. The control element may comprise an active control component that is configured to vary the electrical properties of the secondary resonator in response to a control signal.

The secondary resonator of each control element may be inductively coupled to its respective resonator, and may comprise a resonant frequency that is matched with a resonant frequency of the respective resonator.

Each control element of the first plurality of the electrical resonators may be on an opposite side of its respective resonator compared with each of the control elements of the second plurality of the electrical resonators.

The wireless power transfer may comprise wireless power transfer from one or more of the electrical resonators to a receiver, wherein the receiver is inductively coupled to the one or more of the electrical resonators. The coupling may be near-field coupling.

According to a fifth aspect of the invention, there is provided a method of arranging a plurality of electrical resonators in an array. Each of the electrical resonators comprises an inductor coil comprising at least one turn. The at least one turn comprises an outer turn defining an outer coil perimeter. Each electrical resonator comprises at least one capacitor connected to the inductor coil. The outer coil perimeter comprises four major edges. Each major edge is arranged on a different edge of a quadrilateral. The outer coil perimeter comprises four minor edges connecting the major edges. The method comprises arranging a first plurality of the electrical resonators in a first layer. The method comprises arranging a second plurality of the electrical resonators in a second layer on top of the first layer, such that the minor edge of each electrical resonator substantially abuts the minor edge of an adjacent electrical resonator in the same layer, and the first and second layer together define a quadrilateral array of the electrical resonators, with a centre of each inductor coil in the first layer coincident with the centre of a gap region between inductor coils in the second layer.

The at least one turn of the inductor coil may comprise a plurality of concentric turns.

The at least one capacitor may comprise one capacitor, or two or more capacitors, and/or a tuning network of capacitors.

In a region where the minor edge of the electrical resonator substantially abuts the minor edge of the adjacent electrical resonator, the distance between a track of the outer turn of the electrical resonator and a track of the outer turn of the adjacent electrical resonator may be substantially similar to the distance between a first turn and an immediately adjacent turn of the electrical resonator.

In the region where the minor edge of the electrical resonator substantially abuts the minor edge of the adjacent electrical resonator, the distance between the track of the outer turn of the electrical resonator and the track of the outer turn of the adjacent electrical resonator may be between 0.05 mm and 0.5 mm.

The first and second layer may together define a rectangular or a square array of the electrical resonators.

The quadrilateral may be a square.

Each electrical resonator may be in accordance with electrical resonator of an aspect of the invention.

BRIEF DESCRIPTION OF THE DRAWINGS

Embodiments will now be described, purely by way of example, with reference to the accompanying drawings, in which:

FIG. 17B is obtained and for the array associated with FIG. 17A.

DETAILED DESCRIPTION

Figure 1A:
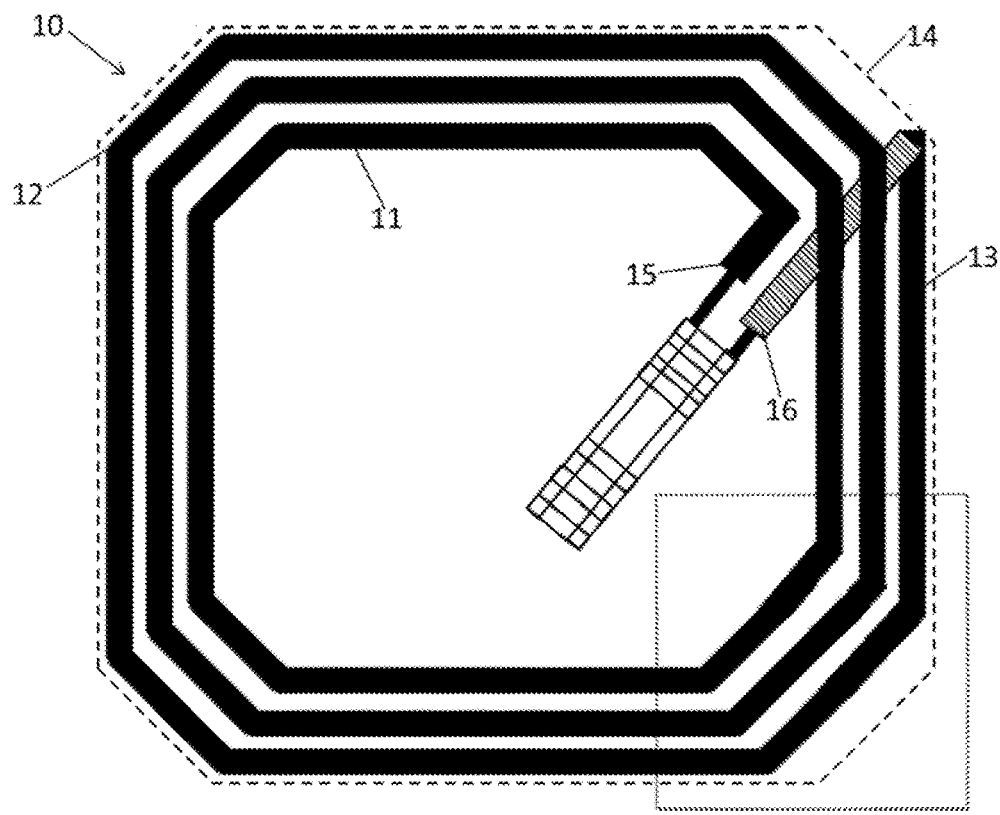
FIG. 1A shows an electrical resonator for wireless power transfer.

An electrical resonator 10 is shown in FIG. 1A. The resonator 10 comprises a series of copper tracks 11 extending between nodes (or vertices) 12 arranged on a substrate, such as a printed circuit board (PCB) (not shown). The tracks 11 form an octagonal inductive coil comprising a plurality of concentric turns. Although three turns are shown in FIG. 1A, it will be appreciated that any suitable number of concentric turns (without limitation to integers) may be used to form the coil (for example 1 to 10 turns). In this example the coil comprises a track with uniform thickness, and with uniform spacing between adjacent tracks, but other layouts are possible (e.g. with non-uniform track width and spacing between adjacent tracks).

As an alternative to the PCB arrangement, the octagonal coil may be formed from a wire which is arranged on a substrate or suspended above the substrate. For example, a Litz wire, multi-strand copper wire, or a solid core copper wire could be placed in a groove on a substrate or wrapped around pegs protruding from a substrate. The coil comprises an outer turn 13 which defines an octagonal coil perimeter 14. The perimeter 14 is shown in more detail in FIG. 2.

Figure 1B:
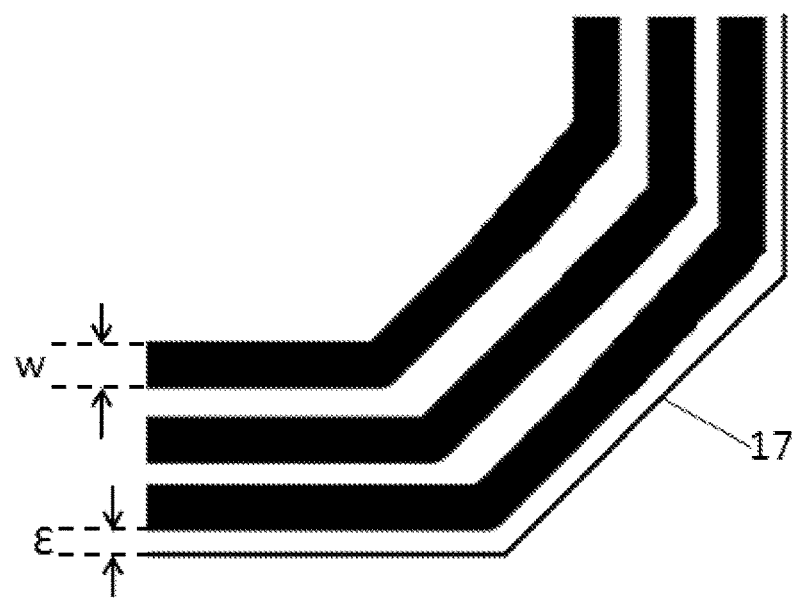
FIG. 1B shows a close up view of the electrical resonator of FIG. 1A.

FIG. 1B is a close up view of a portion of the resonator 10 of FIG. 1A, indicated by the dotted line in FIG. 1A. FIG. 1B shows the individual tracks 11 of the resonator 10 in further detail. Also shown in FIG. 1B is an edge 17 of the PCB. The dimension labelled 'w' on FIG. 1B is the width of an individual track 11. The dimension labelled 'ε' is the distance between the outermost edge of the outermost track 11 (the outer turn 13) and the edge of the substrate and is referred to below with reference to FIGS. 5 and 6.

Figure 2A:
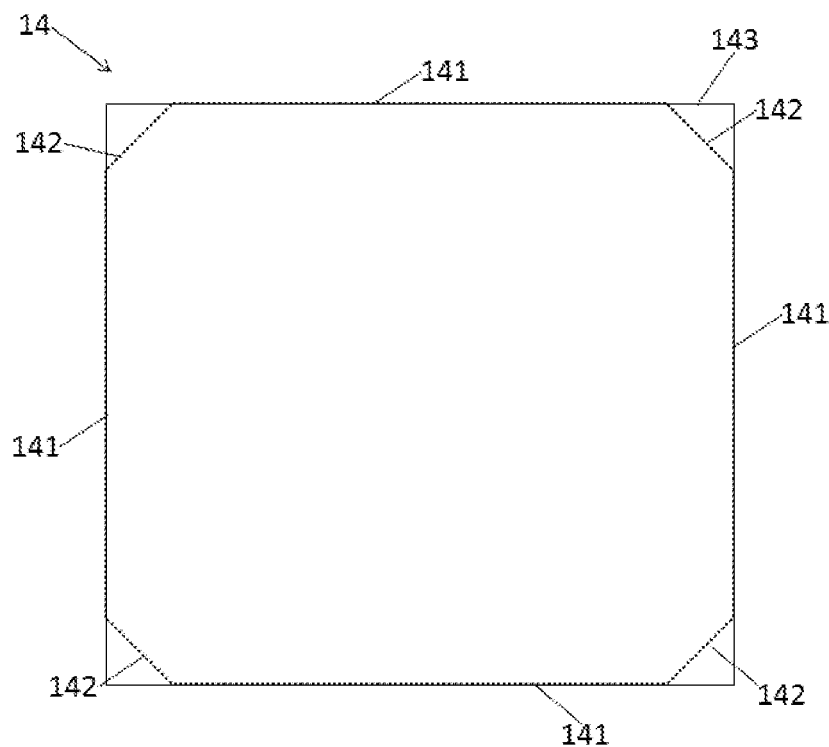
FIG. 2A shows a perimeter of the electrical resonator of FIG. 1.
Figure 2B:
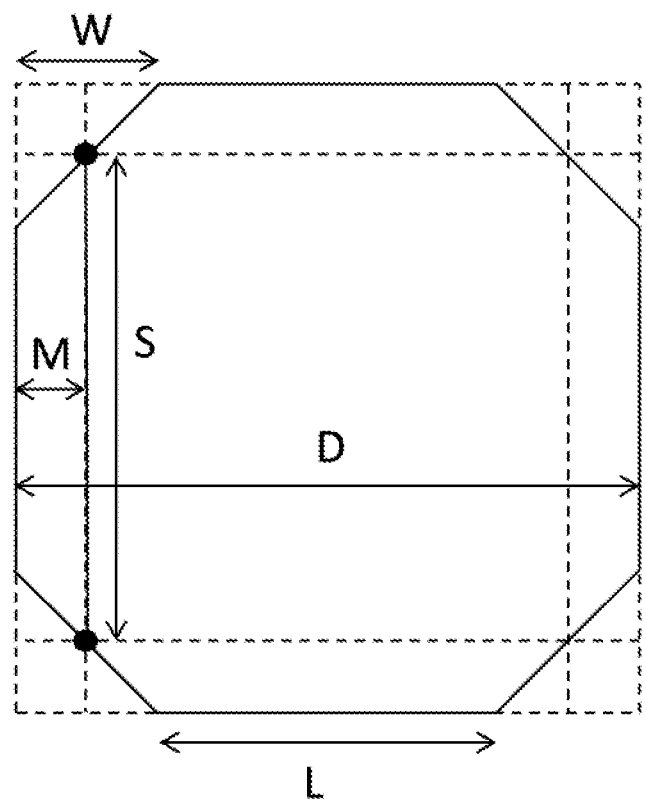
FIG. 2B shows geometric parameters of an electrical resonator.

Referring to FIG. 2A, the perimeter 14 comprises four major edges 141 and four minor edges 142 connecting the four major edges 141. The four major edges 141 are each arranged on a different edge of a rectangle 143. Each of the minor edges 142 is oriented at 45 degrees to each of the major edges 141 that it is connected to. In other words, each of the minor edges 142 meets an edge of the rectangle 143 at a 45 degree angle. In this embodiment, the rectangle is a square, but this is not essential.

The resonator 10 further comprises a capacitor used to tune the frequency of a current passing through the coil. Referring back to FIG. 1A, the capacitor may comprise at least one capacitor element connected between the start point 15 and end point 16 of the coil. The at least one capacitor element may be disposed on the same side of the substrate as the coil, or on the opposite side (e.g. connected by conducting vias in the substrate). The capacitor elements may be disposed within the coil, and a first electrode of each capacitor element connected to the start point 15. The second electrode of each capacitor element may be connected to the end point 16, for example using a metal track or wire that crosses the turns of the coil without making electrical contact therewith).

Figure 3A:
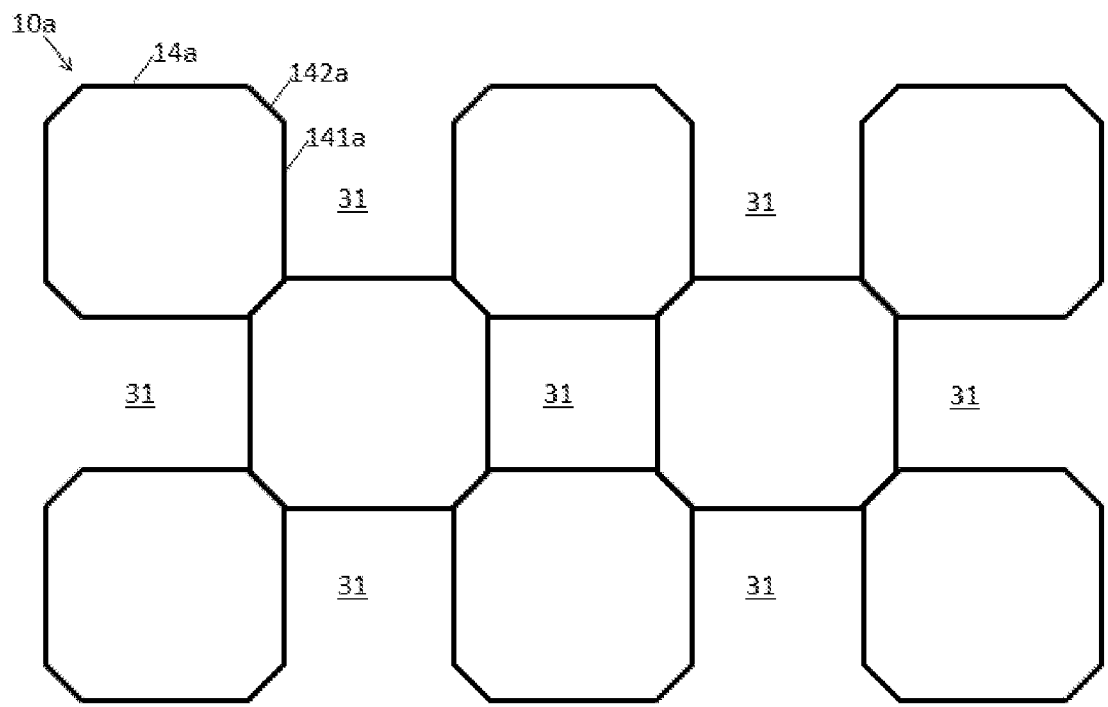
FIG. 3A shows an arrangement of a first plurality of the electrical resonator of FIG. 1.
Figure 3B:
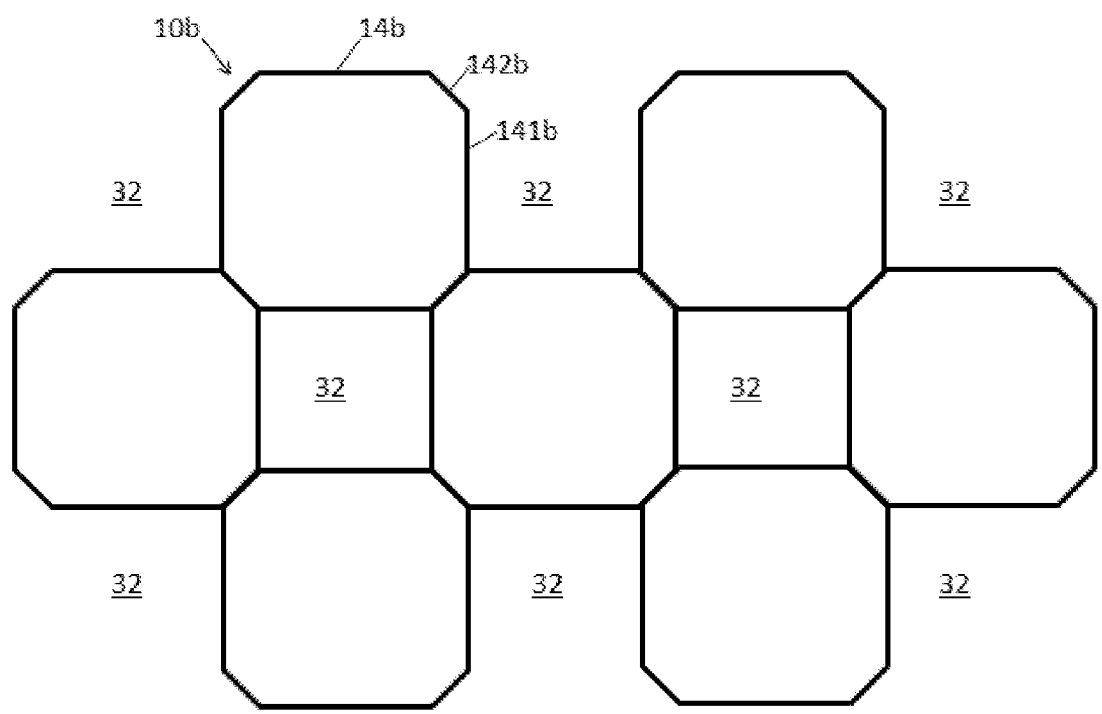
FIG. 3B shows an arrangement of a second plurality of the electrical resonator of FIG. 1.

FIG. 3A shows a first plurality of resonators 10a and FIG. 3B shows a second plurality of resonators 10b. Each of the resonators 10a, 10b is equivalent to a resonator 10 as described above. For clarity, the individual turns of the coils of each resonator 10a, 10b are not shown in FIGS. 3A and 3B. Instead, the perimeter 14a of each resonator 10a in the first plurality of resonators 10a is shown in FIG. 3A and the perimeter 14b of each resonator 10b in the second plurality of resonators 10b is shown in FIG. 3B. Each resonator 10a of the first plurality of resonators 10a comprises four major edges 141a and four minor edges 142a, and each resonator 10b of the second plurality of resonators 10b comprises four major edges 141b and four minor edges 142b.

Each resonator 10a in the first plurality of resonators 10a is located in the same plane, and each resonator 10b in the second plurality of resonators 10b is located in the same plane. The resonators 10a, 10b are arranged such that the minor edges 142a, 142b of adjacent resonators 10a, 10b substantially abut one another. The major edges 141a of adjacent resonators 10a in the first plurality of resonators 10a together define gap regions 31 between the resonators 10a. In the same way, the major edges 141 of adjacent resonators 10b in the second plurality of resonators 10b together define gap regions 32 between the resonators 10b.

Figure 4A:
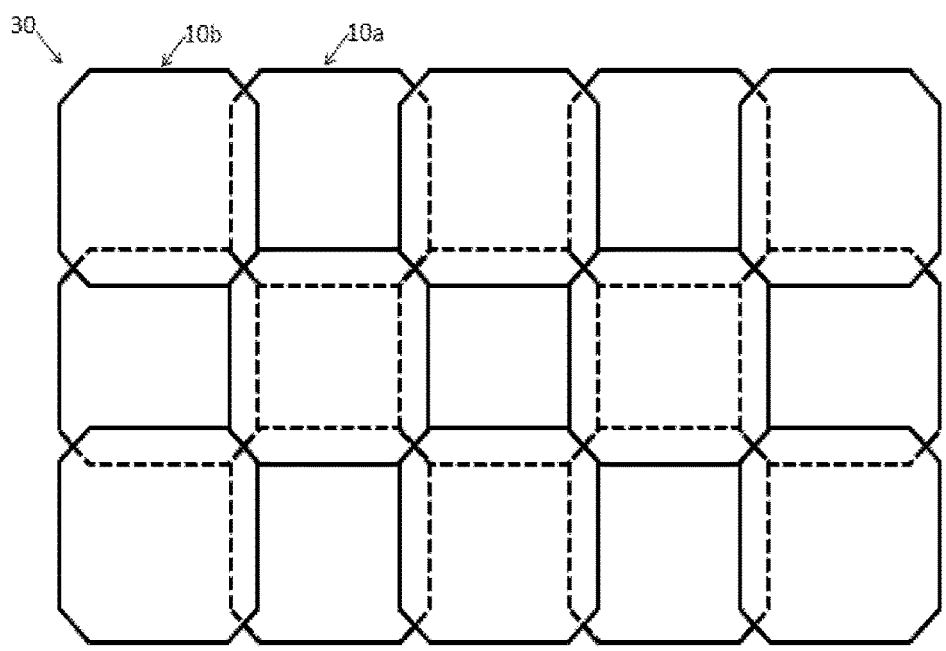
FIG. 4A shows an array of electrical resonators for wirelessly transferring power to a receiver, shown in a plan view.
Figure 4B:
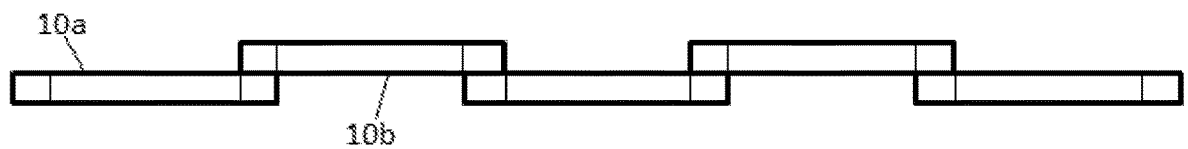
FIG. 4B shows a single row of the array of electrical resonators of FIG. 2A shown in a side view.

FIG. 4A shows a plan view of an array 30 of resonators 10a, 10b, and FIG. 4B shows a side view of a single row of resonators 10a, 10b in the array 30. The array 30 comprises the first plurality of resonators 10a and the second plurality of resonators 10b. With reference to FIGS. 3A, 3B, 4A and 4B, each major edge 141a of each resonator 10a in the first plurality of resonators 10a is parallel to each major edge 141b of each resonator 10b in the second plurality of resonators 10b.

The first plurality of resonators 10a lies in a first plane to define a first layer of resonators 10a and the second plurality of resonators 10b lies in a second plane above the first plane to define a second layer of resonators 10b.

As shown in FIGS. 4A and 4B, the resonators 10a, 10b in the array 30 are arranged in an overlapping arrangement. A centre of the inductor coil of each resonator 10a in the first layer of resonators 10a is coincident with the centre of a gap region 32 of the second layer of resonators 10b.

Figure 5:
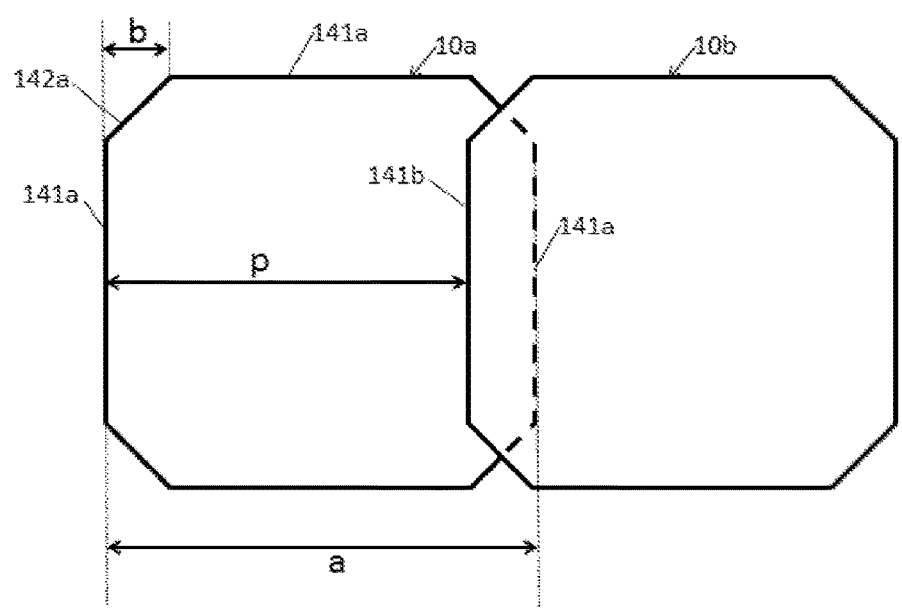
FIG. 5 shows a spatial relationship between two electrical resonators lying in different planes.

The spatial relationship between neighbouring resonators 10, 10b in the array 30 will be described with reference to FIGS. 5 and 6. FIG. 5 shows two neighbouring resonators 10a, 10b in the array 30; a first resonator 10a from the first plurality of resonators 10a and a second resonator 10b from the second plurality of resonators 10b. The first resonator 10a comprises major edges 141a. Extending between perpendicular major edges 141a is a minor edge 142a.

The dimension labelled 'a' in FIG. 5 is the distance between the vertical parallel major edges 141a, as viewed in FIG. 5. The dimension labelled '11' is the distance between the vertex at which one of the major edges 141a meets a minor edge 142a and the vertex at which the other major edge 141a meets the minor edge 142a in a direction perpendicular to the vertical parallel major edges 141aa. The dimension labelled 'p' is the distance between a vertical major edge 141a and the nearest major edge 141b of the second resonator 10b in a direction perpendicular to the major edge 141a. The relationship between the dimensions 'a', 'b' and 'p' is defined as:

$$p = a - b + 2\varepsilon$$

Figure 6:
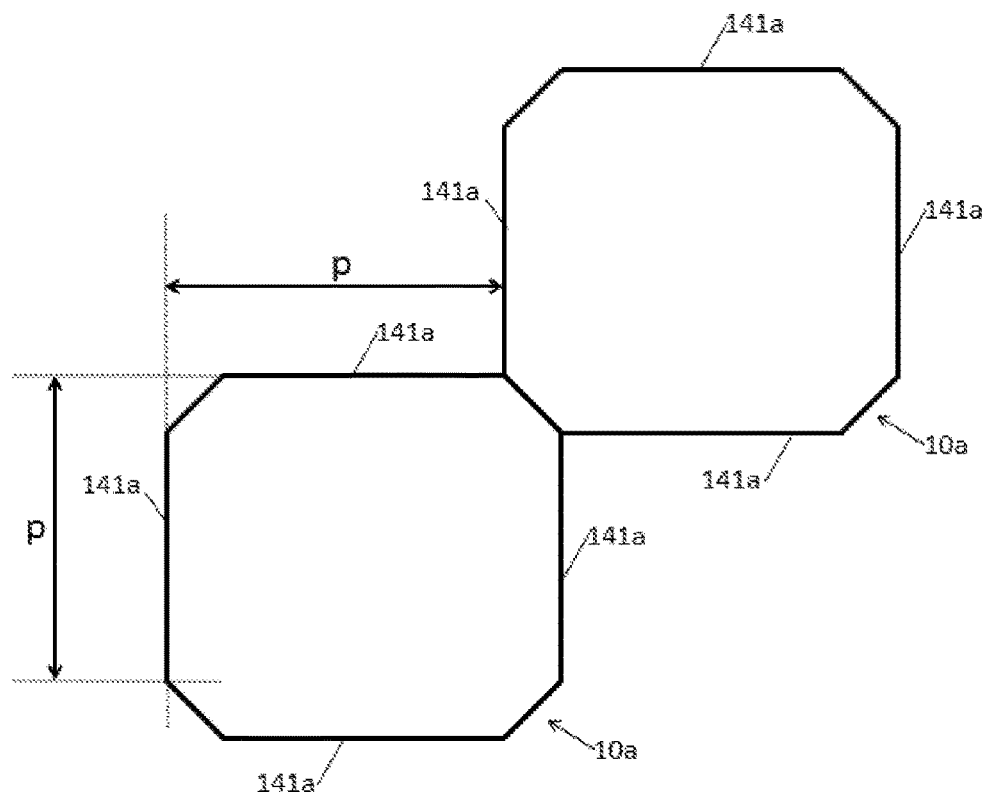
FIG. 6 shows a spatial relationship between two electrical resonators lying in the same plane.

FIG. 6 shows two adjacent resonators 10*a* in the first layer of resonators 10*a*. Each resonator 10*a* comprises first, second and third major edges 141*aa*, 141*ab*, 141*ac*, as described above with reference to FIG. 5, as well as a fourth major edge 141*ad* parallel to the third major edge 141*ac*. The distance between the first major edges 141*aa* of the resonators 10*a*, and the distance between the third major edge 141*ac* and the fourth major edge 141*ad* of each resonator 10*a* is equal to the dimension 'p' described above with reference to FIG. 5.

Figure 7A:
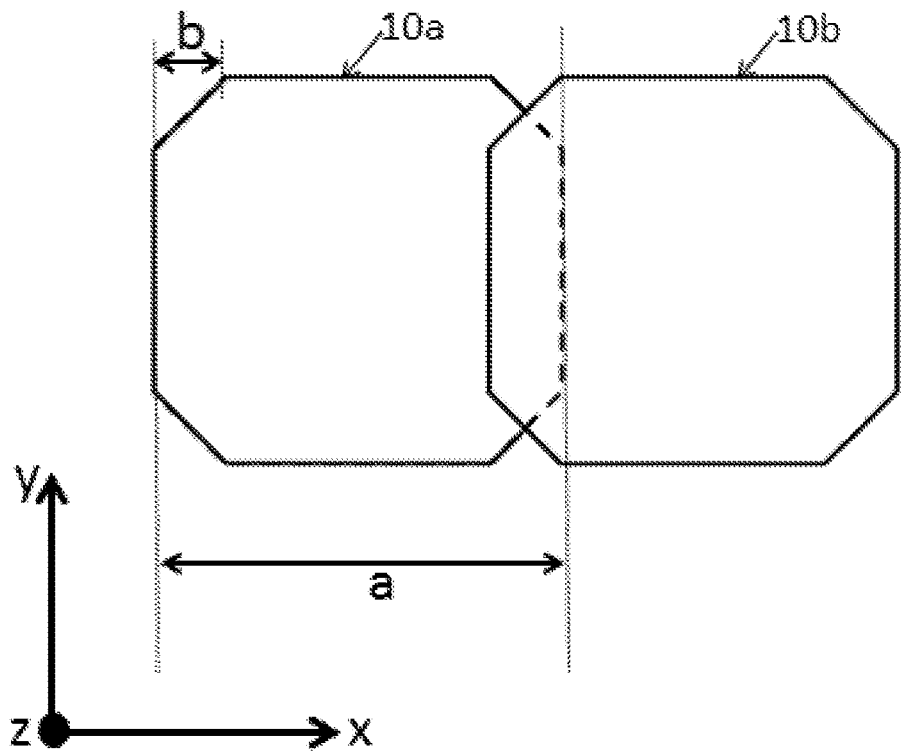
FIG. 7A shows two adjacent electrical resonators lying in different planes.

FIG. 7A shows two neighbouring resonators 10*a*, 10*b* in the array 30; a first resonator 10*a* from the first plurality of resonators 10*a* and a second resonator 10*b* from the second plurality of resonators 10*b*. The dimensions 'a' and 'b' as described with reference to FIG. 5 are shown in FIG. 7, with 'a' equal to 80 mm and 'b' equal to 18 mm.

Figure 7B:
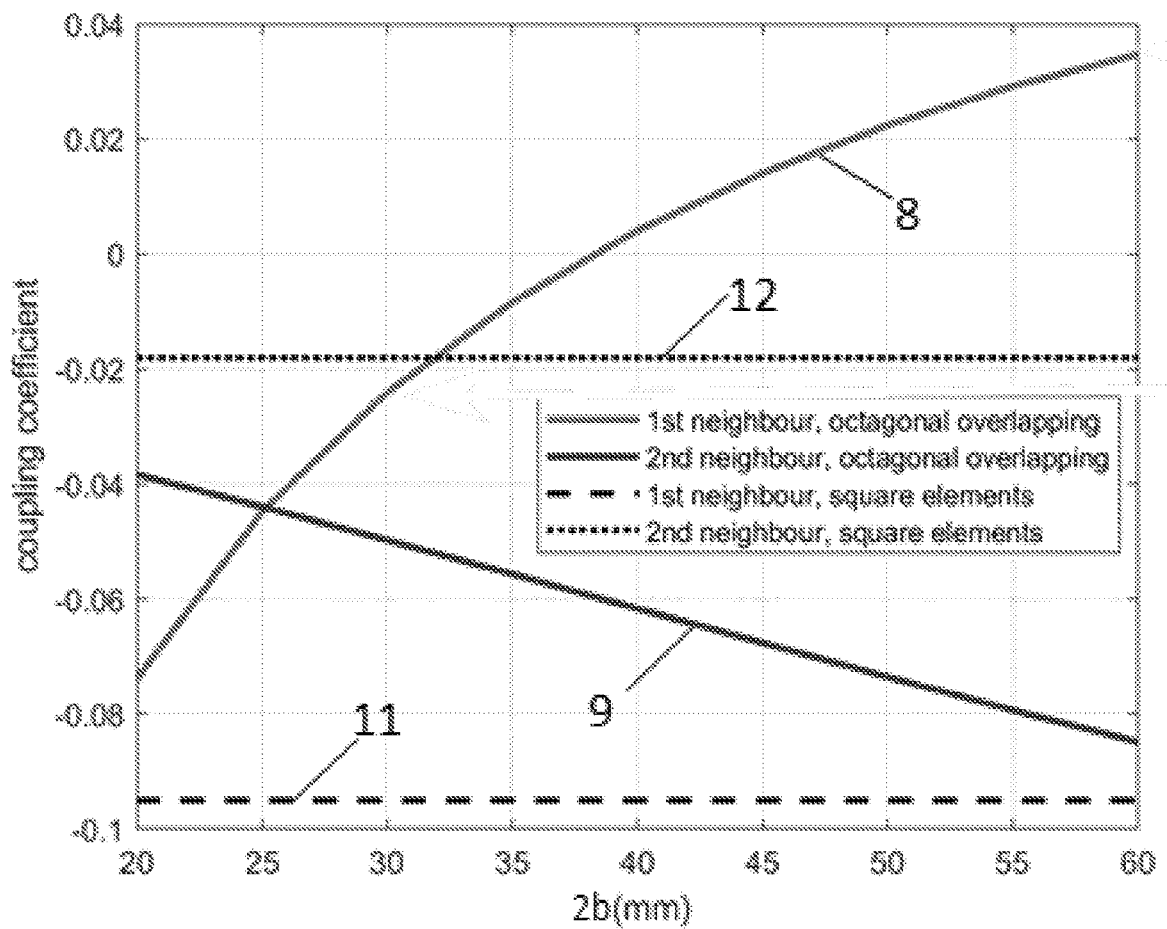
FIG. 7B shows a graph showing the relationship between: the spatial relationship between two electrical resonators lying in different planes, and a coupling coefficient between the two electrical resonators.

FIG. 7B shows a graph illustrating the relationship between 'b' (represented on the x-axis by 2×b) and coupling coefficient (for constant 'a'), as described with respect to FIGS. 5 and 6. The coupling coefficient is defined as the ratio of mutual inductance and the geometric mean of the self-inductance of the adjacent resonators.

Curve 8 in FIG. 7B shows the variation in coupling coefficient with 'b' between first order nearest-neighbour resonators, such as those shown in FIGS. 7A and 7B, and line 9 shows the variation in coupling coefficient with 'b' between second order nearest-neighbour resonators. Lines 12 and 11 show coupling coefficients between first order nearest neighbour and second order nearest neighbours respectively for a square coil, for comparison purposes. As illustrated changing dimension 'b' can produce positive, zero and negative coupling values between first order nearest neighbours. The example of FIG. 7B is based on a two-loop octagonal coil made of 70 um copper track, with track width w=2 mm, gap between the tracks in the neighbouring loops equal to 2 mm, a=80 mm and ε=0.5 mm, the coils being placed on an FR4 substrate with a thickness of 1.5 mm.

Arranging an array of resonators, in which each resonator comprises an octagonal coil perimeter, in an overlapping arrangement, such as in the array 30, may increase the inductive coupling between the coils of neighbouring resonators compared to known arrays in which each resonator comprises a square coil perimeter and the resonators are arranged side-by-side. In addition, an overlapping arrangement provides more freedom to control targeted wireless power transfer in a large-area wireless power transmitter, where neighbouring coils act as relays, for example in the case of wireless power transfer based on magneto-inductive waves. Overlapping the coils of neighbouring resonators has also been found to provide a smoother near-field profile of the H-field generated directly above the coils at distances smaller or comparable to the size of the coils when compared to a side-by-side arrangement of resonators.

In a particular example arrangement of resonators according to the invention, a coupling coefficient of −0.14 is achieved between two identical two-loop octagonal coils. In this example, a=58 mm, 2b=12.66 mm, the track width 'w' of each coil is 3 mm and a gap between the tracks is 0.5 mm. The coils are separated by 54.5 mm in the 'x' direction as indicated in FIGS. 7A and 7B, i.e. p=54.5 mm. The coils are separated in the 'y' and 'z' directions by 0 mm and 1 mm respectively. For comparison, a coupling coefficient of −0.08 is achieved between adjacent two-loop square coils made of the same tracks and separated by 62 mm, 0 mm, 0 mm in x, y, z.

With a minimal change in inductance, a dramatic increase of the coupling coefficient reflects stronger coupling. Coupling can be improved by at least 50%. In certain embodiments, the magnitude of the coupling coefficient may be at least 0.1. Coupling coefficient (between nearest neighbours) may be negative. Improved inter-coil coupling may improve the efficiency of wireless power transfer when the one or more of the resonators are configured as relays, for example, in a metamaterial.

Figure 8A:
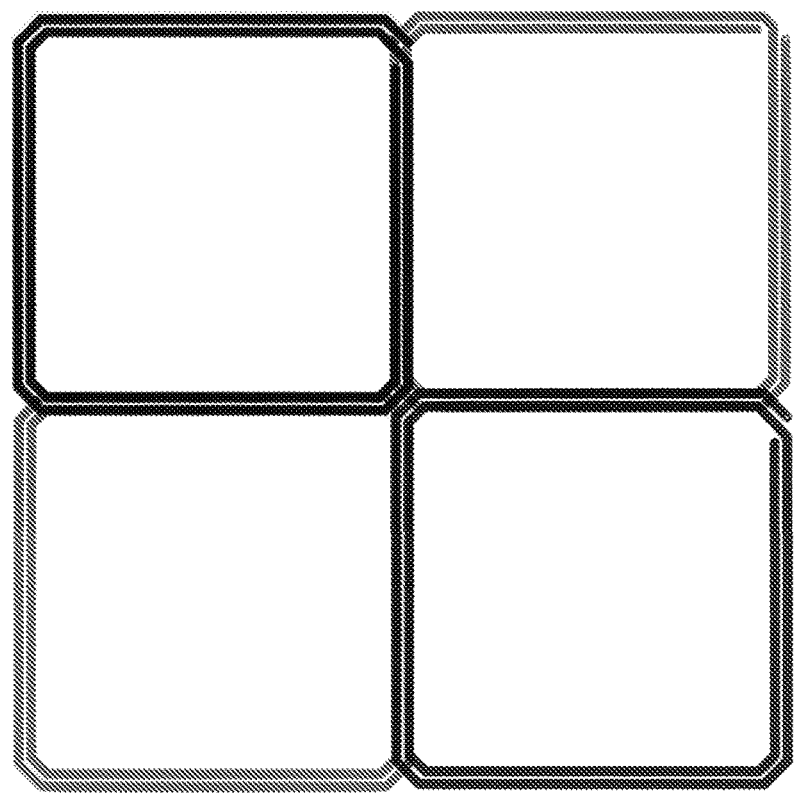
FIG. 8A shows four electrical resonators lying in different planes.

FIG. 8A shows a view of four neighbouring resonators 10 arranged such that first-order neighbours are disposed in different planes and second-order neighbours are in the same plane. Considering the electrical resonator shown in the top left of the figure, it can be seen from the figure that its first-order neighbouring resonators (top right and bottom left) are in a different plane, whereas its second-order neighbouring element (bottom right resonator) is in the same plane. This configuration has been shown to provide a more uniform field distribution directly above the resonators compared to the same coils placed side-by-side (with no overlap)—see FIGS. 18A-C, for example. In the embodiment of FIG. 8A, the tracks of coils in nearest order neighbours are aligned on top of each other in the array. This has been found to be advantageous in preventing dead spots where between nearest neighbours, where power transfer efficiency would otherwise be reduced. It is not essential that the tracks or wires of coils in nearest neighbours are precisely aligned—a similar advantage is achieved when a coil region (between an inner and outer perimeter of the coil) of each nearest neighbour overlaps (preferably in the region of the respective overlapping major edges).

Figure 8B:
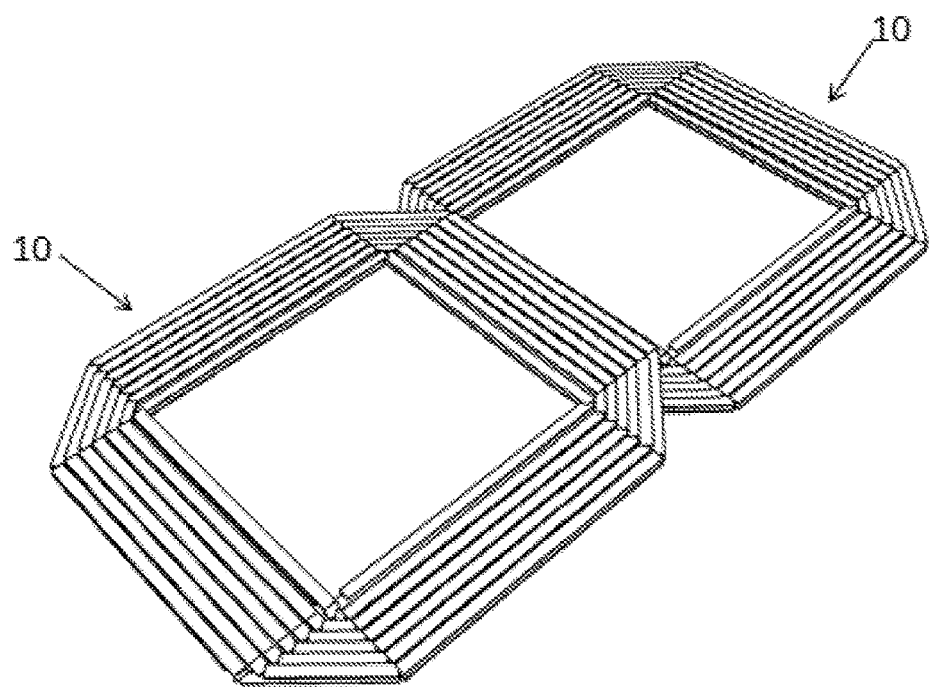
FIG. 8B shows two electrical resonators 1 lying in different planes.

FIG. 8B shows a view of a pair of first-order neighbouring resonators 10 arranged in an overlapping manner. This configuration has been shown to provide a more uniform field distribution directly above the resonators compared to the same coils placed side-by-side (with no overlap)—see FIGS. 18A-C, for example.

Figure 9A:
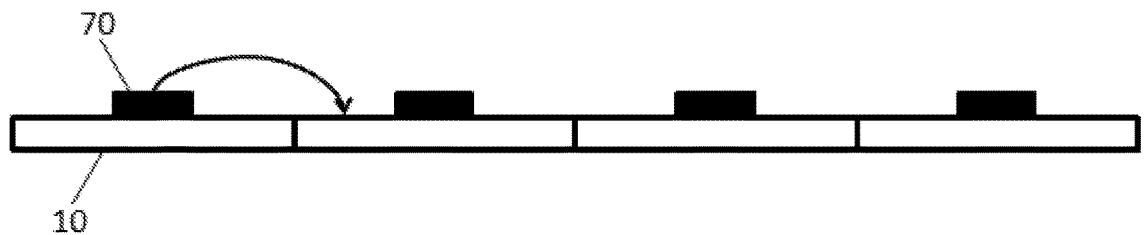
FIG. 9A shows a single row of an array of electrical resonators.

FIG. 9A shows a side view of a single row of an array of inductively coupled resonators 10 arranged side-by-side. The array comprises a control element 70 for each resonator 10. Each control element 70 can be set to one of two operating states: in a first state the control element 70 is resonant at the same or similar frequency as the corresponding resonator 10 such that the resonator 10 does not transmit any power to its neighbouring resonators, and in a second state in which the control element 70 causes the corresponding resonator 10 to transmit power to its neighbouring resonators. An example of such a control arrangement is described in WO2017/158374A1.

In the second state, the control element 70 does not have any significant impact on the impedance of the corresponding resonator 10. A dedicated control element 70 is provided for each resonator 10 in the array to enable individual control of the resonators in order to control the direction of power transfer across the array. Examples of how such control of power transfer may be achieved are described in WO2018/229494A1.

Figure 9B:
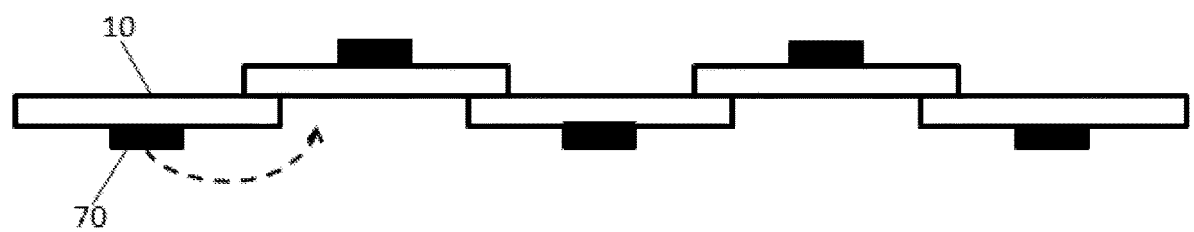
FIG. 9B shows a single row of an alternative array of electrical resonators to that of FIG. 9A.

In the side-to-side arrangement of resonators shown in FIG. 9A, the may be non-negligible coupling between the control element 70 and the first order nearest neighbour resonator (illustrated schematically by the solid arrow in FIG. 9A). This may compromise the performance of the resonators of the array, and the level of control that may be achieved. By arranging the resonators in an array in an overlapping arrangement as shown in FIG. 9B, with control elements corresponding to adjacent resonators being coupled to opposing surfaces of the adjacent resonators, the distance between a control element 70 of a first resonator 10 and an adjacent second resonator can be increased compared to a side-by-side arrangement such as that of FIG. 9A. This mitigates the undesirable coupling between control elements and adjacent resonators (illustrated schematically by the dashed arrow in FIG. 9B), which may improve performance and control of power transfer across the array.

Figure 10A:
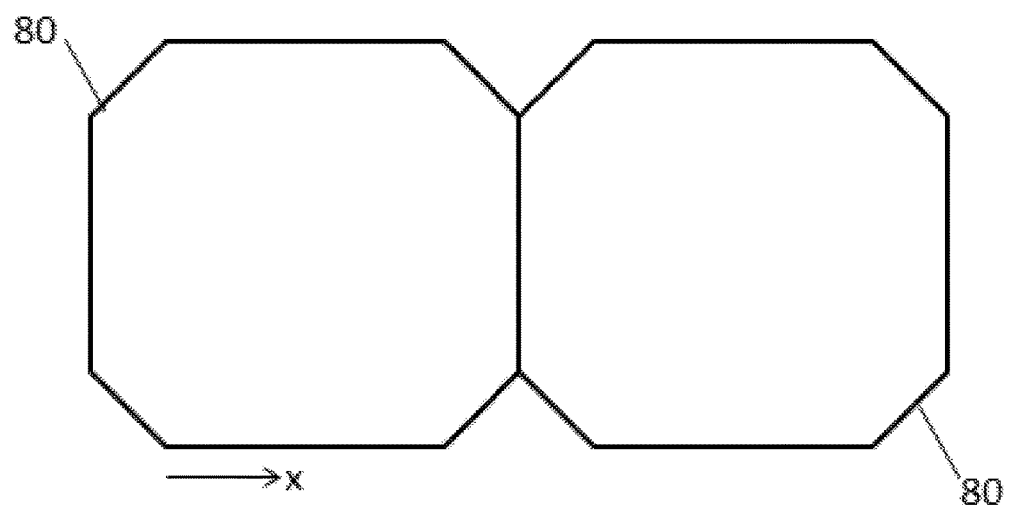
FIG. 10A shows two adjacent electrical resonators lying in the same plane.
Figure 10B:
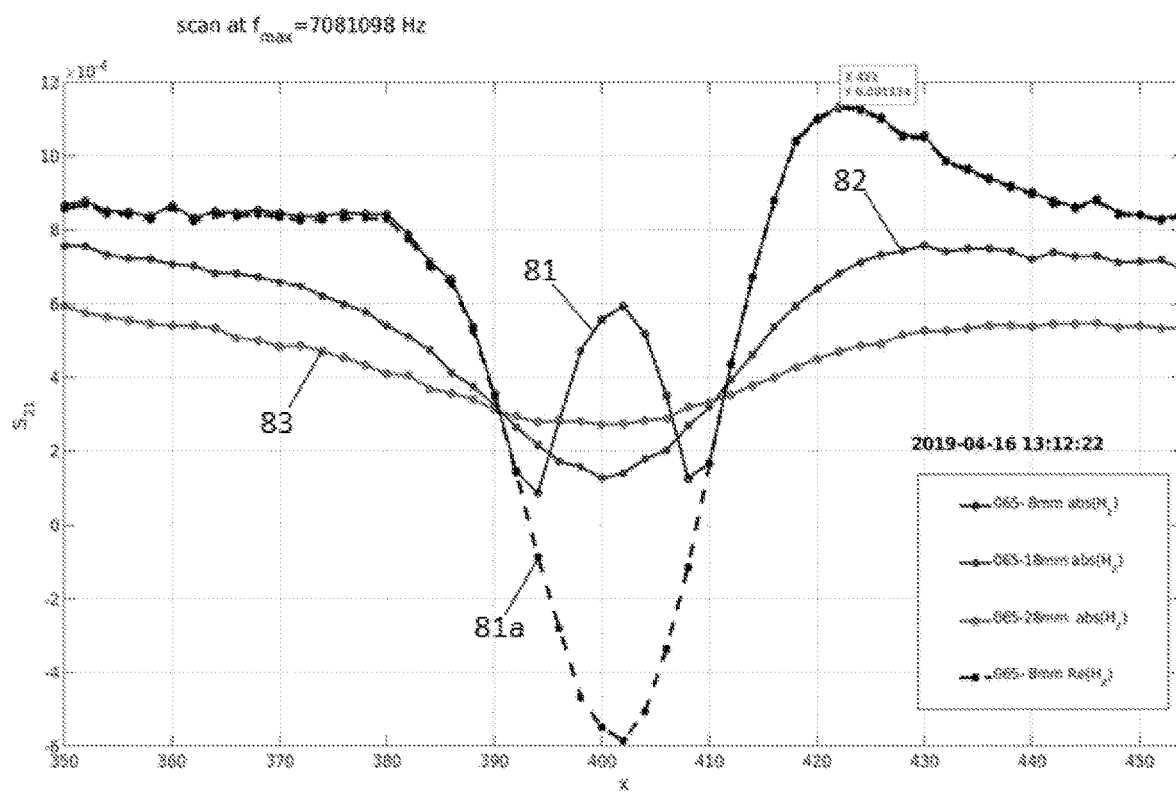
FIG. 10B is a graph showing the relationship between: the spatial relationship between the electrical resonators of FIG. 10A, and S21.
Figure 11A:
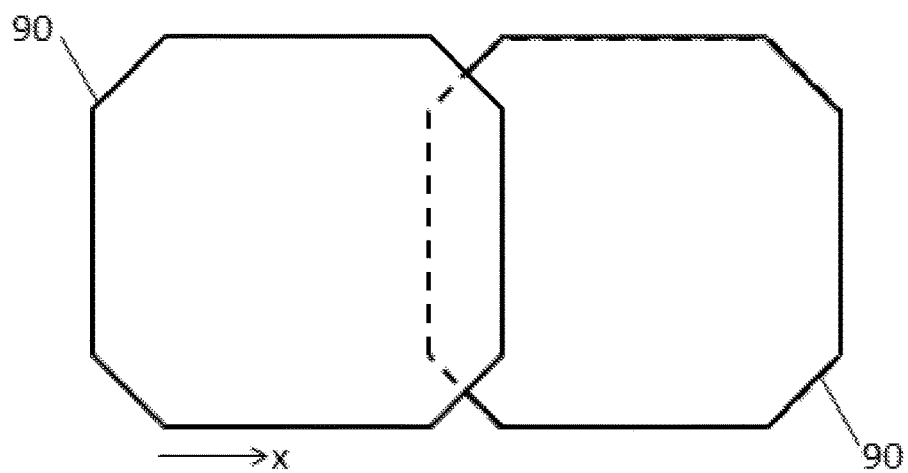
FIG. 11A shows two adjacent electrical resonators lying in different planes.
Figure 11B:
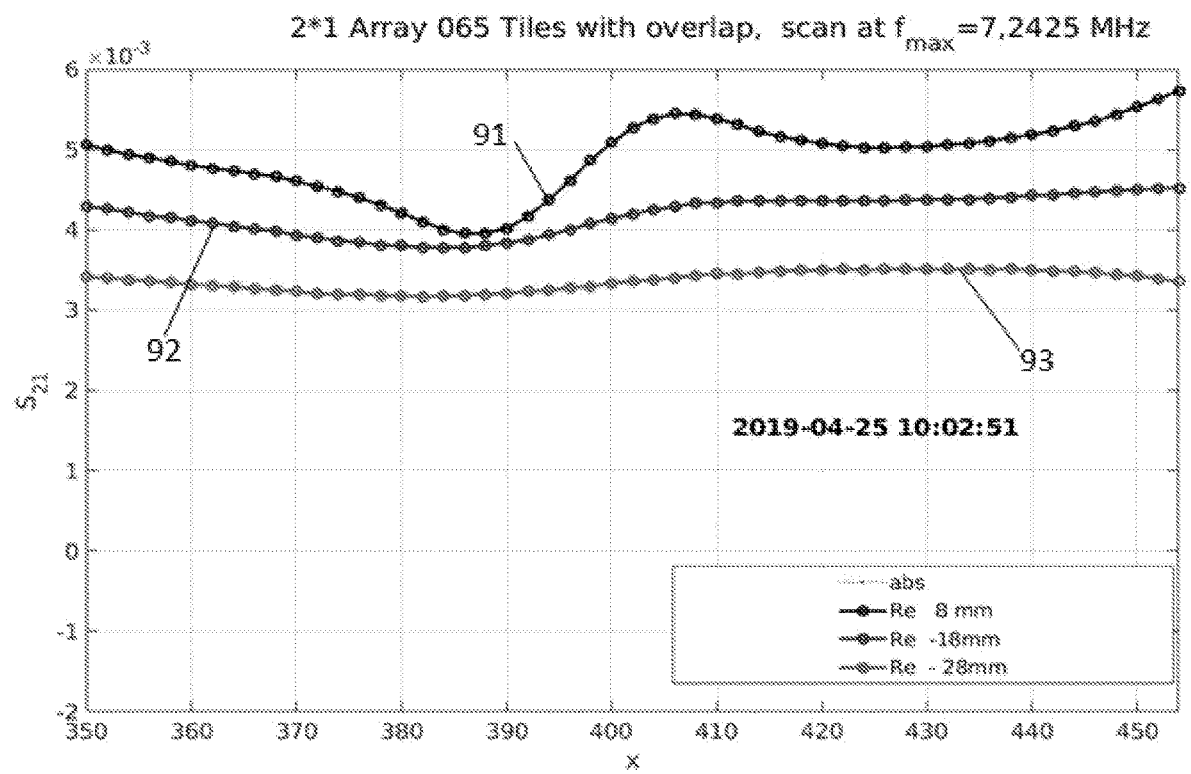
FIG. 11B is a graph showing the relationship between: the spatial relationship between the electrical resonators of FIG. 10A, and S21.

FIG. 10A shows a pair of resonators 80 arranged in a side-by-side non-overlapping manner and FIG. 11A shows a pair of resonators 90 arranged in an overlapping manner (according to an embodiment). The graphs of FIGS. 10B and 11B show the relationship between the position of a probe coil above the respective pairs of resonators 80, 90 in the 'x' direction, labelled in FIGS. 10A and 11A and represented by the x-axis in FIGS. 10B and 11B, and $S_{21}$, the ratio of the amplitude of the electrical signal, i.e. electrical power, received by the probe to the amplitude of the electrical signal input to the resonators, represented by the y-axis in FIGS. 10B and 11B. FIGS. 10B and 11B represent probe measurements with the resonators driven at approximately 7.08 MHz in FIG. 10B and 7.24 MHz in FIG. 11B. The line labelled 81 in FIG. 10B represents the relationship between the position of the probe relative to the resonators in the 'x' direction and the absolute magnitude value of $S_{21}$ for a first height of the probe above the resonators, for example 8 mm. The line labelled 81a represents the real component, i.e. the phase, of $S_{21}$ for the first probe height. The lines labelled 82 and 83 represent the 'x' direction vs $S_{21}$ relationship, for absolute values of $S_{21}$, for second and third heights of the probe above the resonators respectively, for example 18 mm and 28 mm respectively. The lines labelled 91, 92 and 93 in FIG. 11B represent the 'x' direction vs $S_{21}$ relationship, for absolute values of $S_{21}$, for probe heights of, for example, 8 mm, 18 mm and 28 mm respectively.

FIGS. 10B and 11B show that for a pair of resonators arranged in a side-by-side manner, the strength of the H-field decreases dramatically as the receiver passes across the boundary between the two resonators. In contrast, in the case of the pair of overlapping resonators, the fluctuations in the H-field remain relatively smooth as the receiver passes over the overlapping regions of the two resonators.

Figure 12:
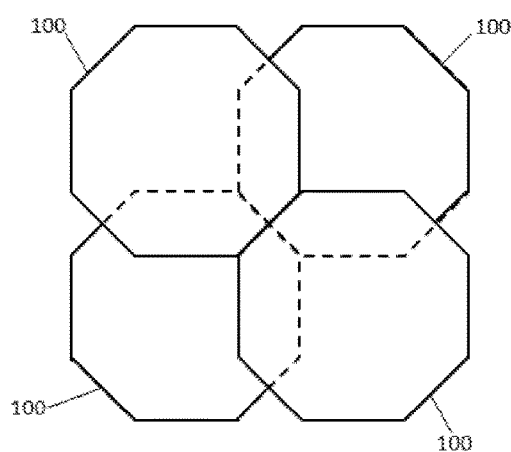
FIG. 12 shows a prior art example of an array of electrical resonators.

FIG. 12 shows an example of an array of four resonators 100 arranged in a similar overlapping manner as the resonators 10a, 10b of the array 30. In contrast to the resonators 10a, 10b, the resonators 100 comprises minor and major edges of equal length.

Figure 13A:
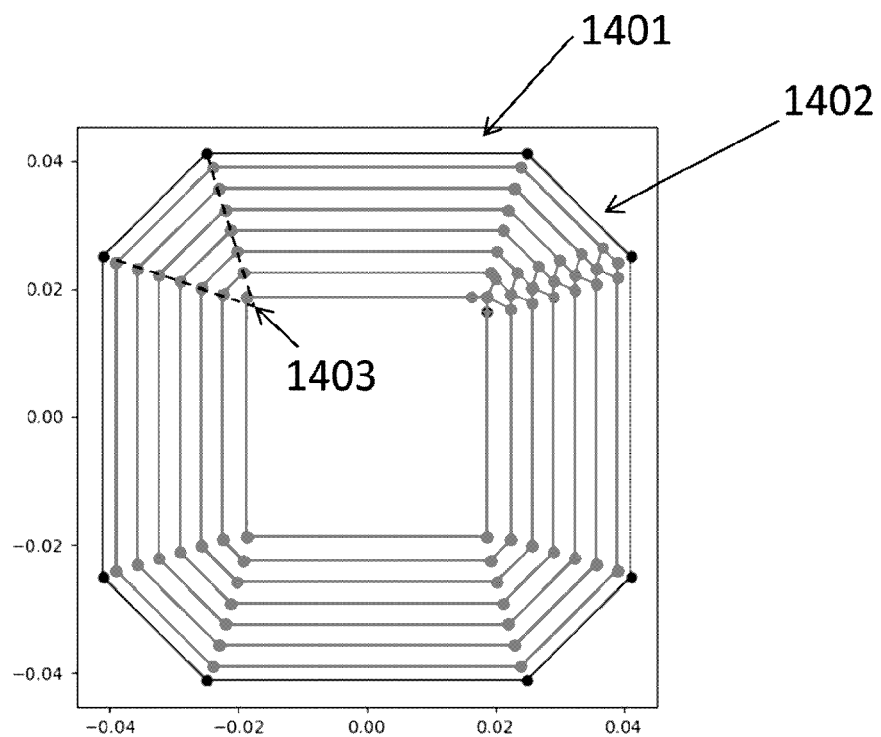
FIG. 13A shows an example embodiment of a resonator with a first relationship of the major and minor edges and a first corner-geometry.

FIG. 13A shows an example embodiment of a resonator comprising major edges 1401 and minor edges 1402, and a convergence point indicated by reference numeral 1403. In this embodiment, the outer perimeter of the windings defines substantially an octagon, and the inner perimeter of the windings defines substantially a square.

Figure 13B:
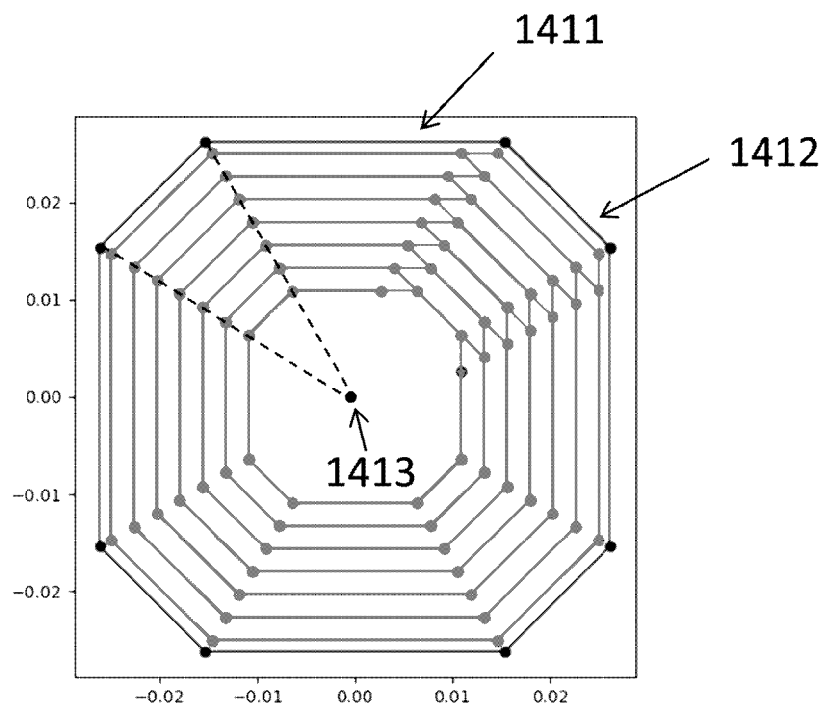
FIG. 13B shows an example embodiment of a resonator with a second relationship of the major and minor edges and a second corner-geometry.

FIG. 13B shows an example embodiment of a resonator comprising major edges 1411 and minor edges 1412, and a convergence point indicated by reference numeral 1413. In this embodiment, both the outer and inner perimeters of the windings define substantially octagons.

Figure 13C:
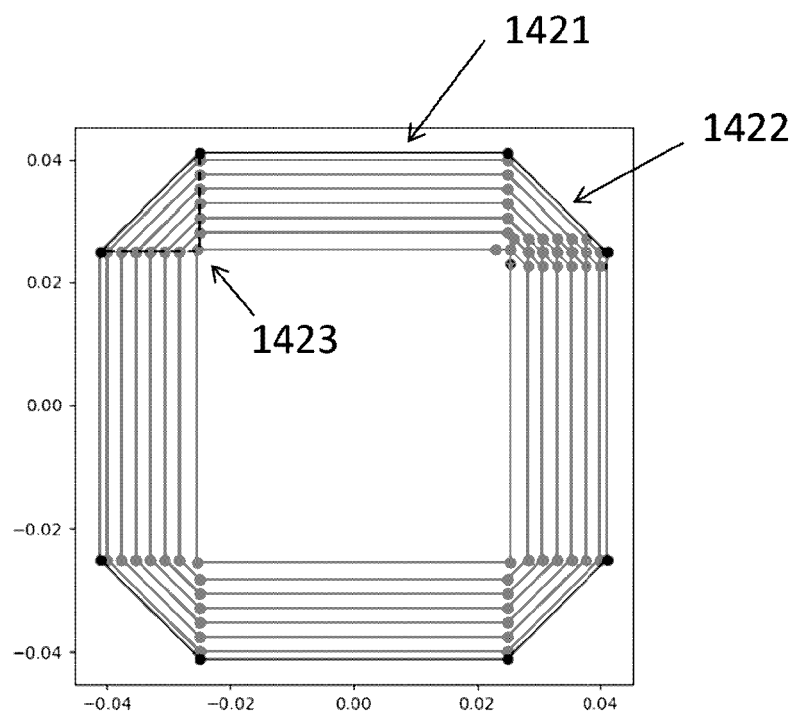
FIG. 13C shows an example embodiment of a resonator with a third relationship of the major and minor edges and a third corner-geometry.

FIG. 13C shows an example embodiment of a resonator comprising major edges 1421 and minor edges 1422, and a convergence point indicated by reference numeral 1423. In this embodiment, the outer perimeter of the windings defines substantially an octagon, and the inner perimeter of the windings defines substantially a square.

Figure 14A:
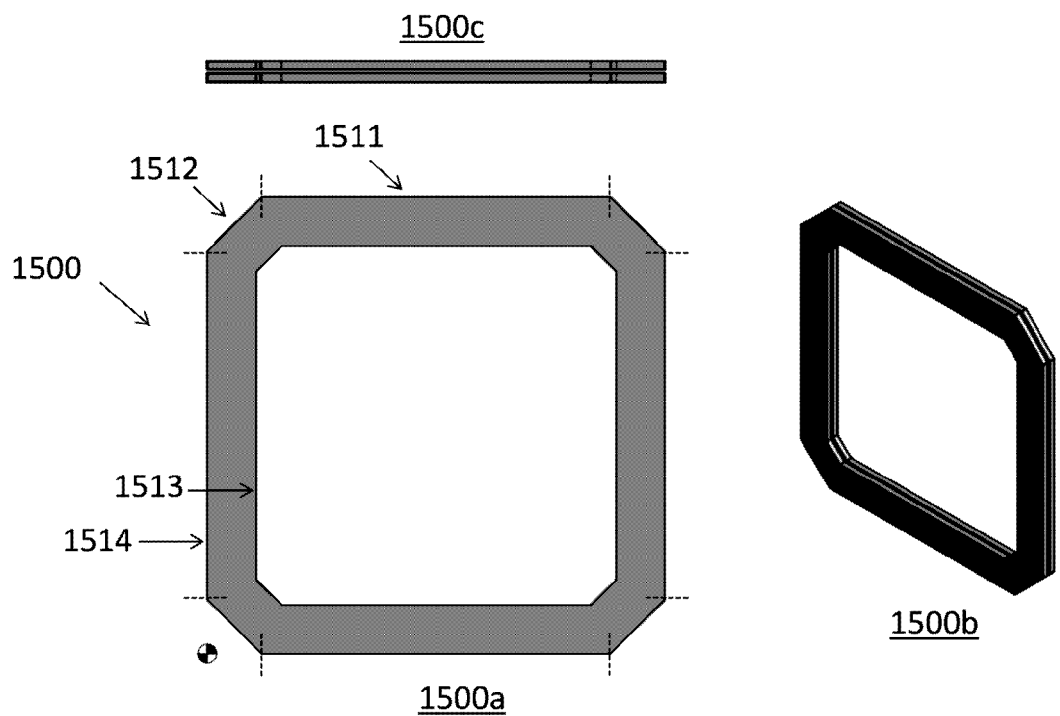
FIG. 14A illustrates three alternative views of an example embodiment of an electrical resonator.

FIG. 14A shows three alternative views 1500a, 1500b, 1500c of an example embodiment of an electrical resonator 1500. Electrical resonator 1500 comprises an inductor coil comprising a plurality of concentric turns (not shown) comprising an outer turn defining an outer coil perimeter 1514 and an inner turn defining an inner coil perimeter 1513. Electrical resonator 1500 also comprises at least one capacitor or tuning network (not shown) connected to the inductor coil. The outer coil perimeter 1514 comprises four major edges 1511. Each major edge 1511 is substantially linear and arranged on a different edge of a quadrilateral. The outer coil perimeter 1514 also comprises four minor edges 1512 connecting the major edges 1511. The length of each major edge 1511 is greater than the length of each minor edge 1512. In other embodiments, portions of the outer coil perimeter 1514 where major and minor edges 1511, 1512 meet may be substantially rounded or curved. In this embodiment, the outer coil perimeter 1514 defines an octagonal outer coil perimeter. In other similar embodiments, the outer coil perimeter 1514 may define a rounded-octagonal outer coil perimeter.

Figure 14B:
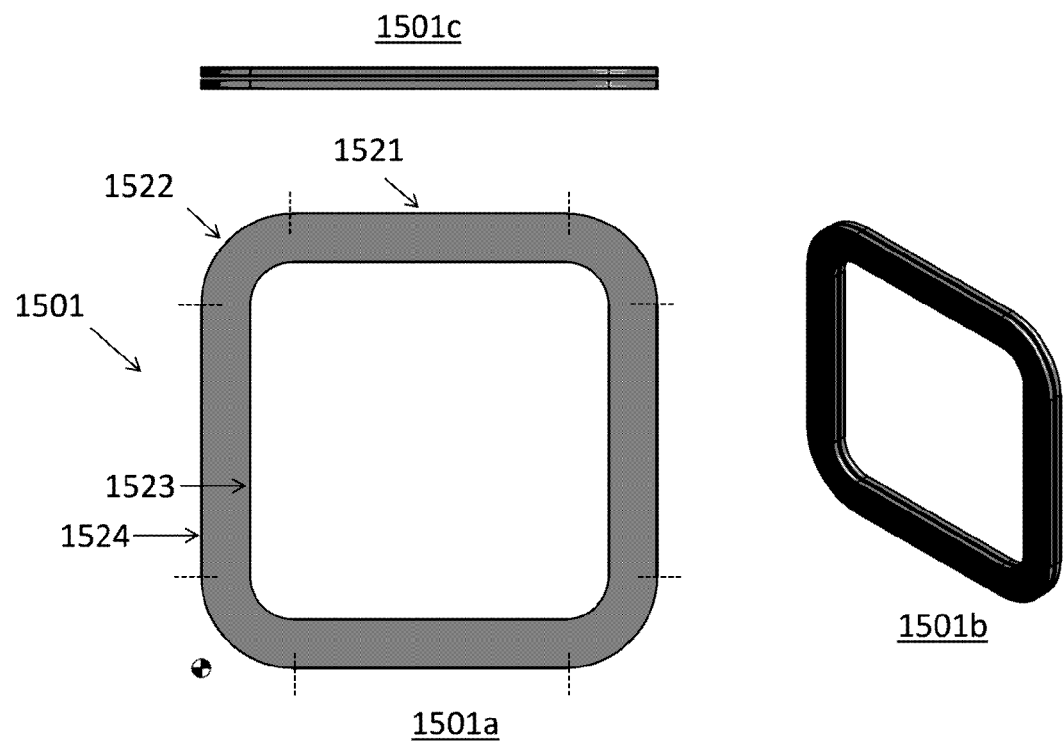
FIG. 14B illustrates three alternative views of an example embodiment of an electrical resonator.

FIG. 14B shows three alternative views 1501a, 1501b, 1501c of an example embodiment of an electrical resonator 1501. Electrical resonator 1501 comprises an inductor coil comprising a plurality of concentric turns (not shown) comprising an outer turn defining an outer coil perimeter 1524 and an inner turn defining an inner coil perimeter 1523. Electrical resonator 1501 also comprises at least one capacitor or tuning network (not shown) connected to the inductor coil. The outer coil perimeter 1524 comprises four major edges 1521. Each major edge 1521 is substantially linear and arranged on a different edge of a quadrilateral. The outer coil perimeter 1524 also comprises four minor edges 1522 connecting the major edges 1521. The length of each major edge 1521 is greater than the length of each minor edge 1522. In this embodiment, the outer coil perimeter 1524 defines a rounded-square outer coil perimeter.

Figure 15A:
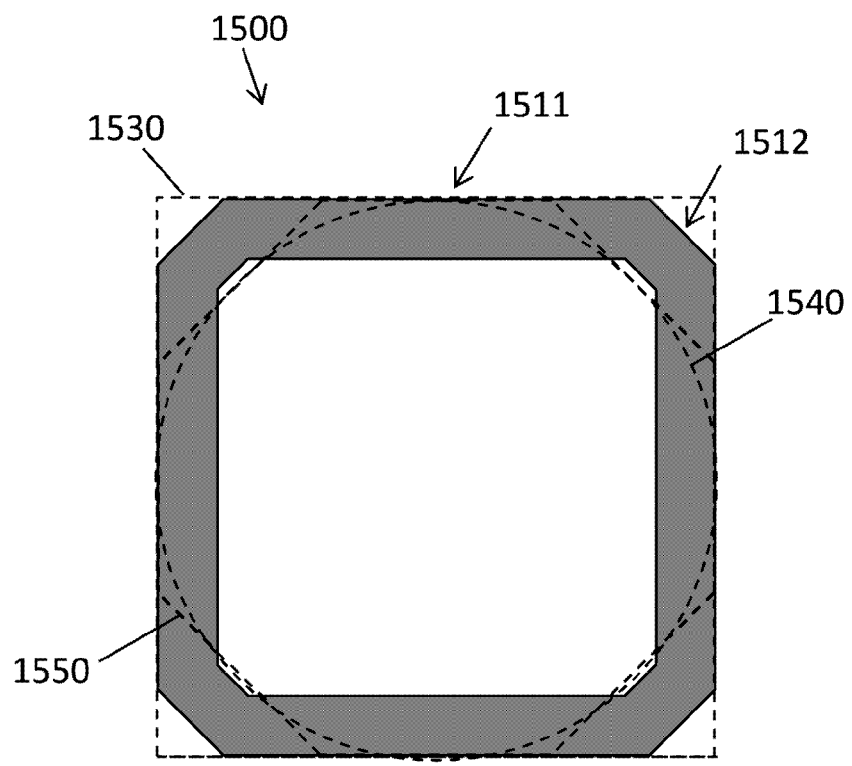
FIG. 15A shows the electrical resonator of FIG. 14A.

FIG. 15A shows electrical resonator 1500 of FIG. 14A. Each of the major edges 1511 is substantially linear and arranged on a different edge of a quadrilateral 1530, which in the case of electrical resonator 1500 is a square. It can be seen in FIG. 15A that the area of the polygon bounded by the outer coil perimeter is less than an area of the quadrilateral 1530 but greater than an area of the largest circle 1540 that fits entirely within the quadrilateral 1530. It can also be seen that the area of the polygon bounded by the outer coil perimeter 1514 is greater than an area of the largest regular octagon 1550 that fits entirely within the quadrilateral 1530. The minor edges 1512 may be disposed between the boundaries of quadrilateral 1530 and circle 1540. The minor edges 1512 may be disposed between the boundaries of quadrilateral 1530 and octagon 1550.

Figure 15B:
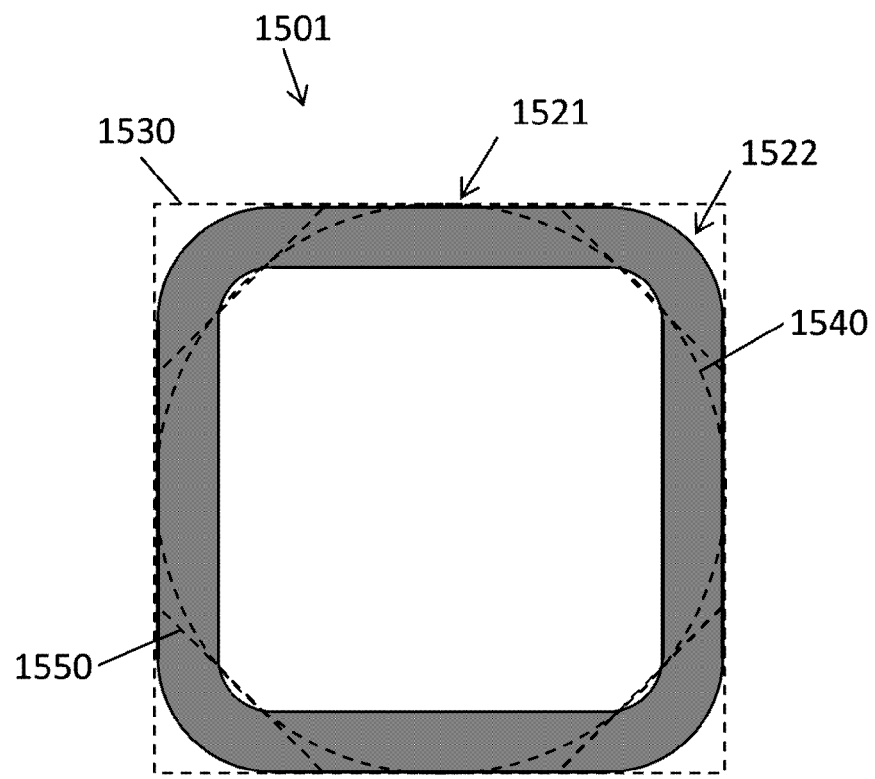
FIG. 15B shows the electrical resonator of FIG. 14B.

FIG. 15B shows electrical resonator 1501 of FIG. 14B. Each of the major edges 1521 is substantially linear and arranged on a different edge of a quadrilateral 1530, which in the case of electrical resonator 1501 is a square. It can be seen in FIG. 15B that the area of the polygon bounded by the outer coil perimeter 1524 is less than an area of the quadrilateral 1530 but greater than an area of the largest circle 1540 that fits entirely within the quadrilateral 1530. It can also be seen that the area of the polygon bounded by the outer coil perimeter 1524 is greater than an area of the largest regular octagon 1550 that fits entirely within the quadrilateral 1530. The minor edges 1522 may be disposed between the boundaries of quadrilateral 1530 and circle 1540. The minor edges 1522 may be disposed between the boundaries of quadrilateral 1530 and octagon 1550.

Electrical resonators according to embodiments may be advantageous in providing a magnetic field that is more uniform across the array. For example, with reference to FIGS. 3A-B and 4A-B, to a plurality of electrical resonators 1500, 1501 may be arranged in an array for wirelessly transferring power to a receiver such that the array comprises a first plurality of the electrical resonators arranged in a first layer, and a second plurality of the electrical resonators arranged in a second layer on top of the first layer, wherein the minor edge 1512 of each electrical resonator 1500 substantially abuts the minor edge 1512 of an adjacent electrical resonator 1500 in the same layer, and the first and second layer together comprise an array (or lattice) of the electrical resonators 1500 with a quadrilateral-shaped unit cell (when viewed in plan-view, such as the example shown in FIG. 4A, where the rectangular-shaped unit cell is a special case of a quadrilateral-shaped unit cell), with a centre of each inductor coil in the first layer coincident with the centre of a gap region between inductor coils in the second layer. The array may provide a more uniform magnetic field than would otherwise be possible with 'simpler' outer coil perimeter geometry.

The geometry of outer coil perimeters 1514 and 1524 of the electrical resonators 1500 and 1501, respectively, may be considered to comprise the geometry of a square with modified corners. Such a square with modified corners may allow the electrical resonators to be arranged substantially in accordance with FIGS. 3A-B. With reference to FIG. 4A, it can be seen that the area of overlap of major-edge track regions in different layers may be much greater than the area of overlap of minor-edge track regions in different layers, when the resonators have an outer coil perimeter geometry similar to those of resonators 1500 or 1501.

Figure 16:
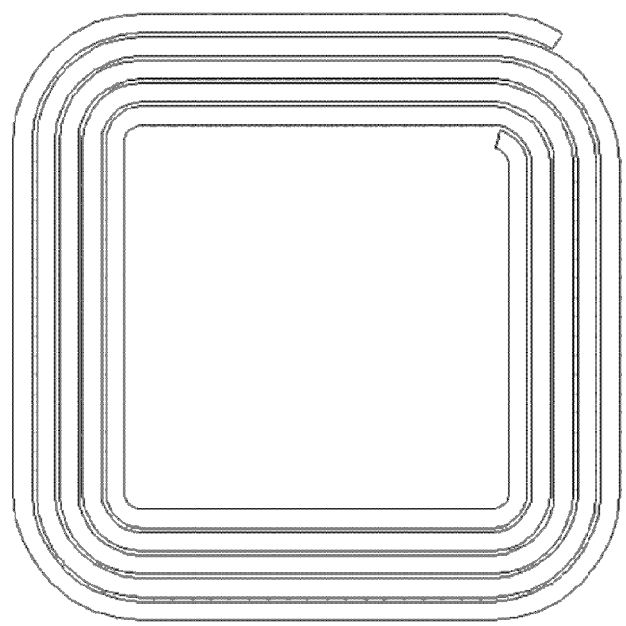
FIG. 16 shows an example embodiment of an electrical resonator.

FIG. 16 shows an example embodiment of an electrical resonator. The electrical resonator comprises an inductor coil that comprises a track. The track may comprise a single strand of Litz wire or multiple strands of Litz wire (e.g. double-strand Litz wire). In practise, a wound wire coil (e.g. comprising Litz wire) may not have sharp corners and/or may not have strictly parallel edges; and a PCB coil may also have slightly rounded corners in practice.

An electrical resonator according to any example embodiment disclosed herein may comprise multiple layers e.g. double-layer or triple-layer wire coil. Multiple layers of the wire coil may increase the inductance and/or the quality factor of the resonator coil while keeping the perimeter of the coil (as viewed in plan-view e.g. view 1500a of FIG. 14A or view 1501a of FIG. 14B) substantially the same as a corresponding single-layer wire coil.

Figure 17A:
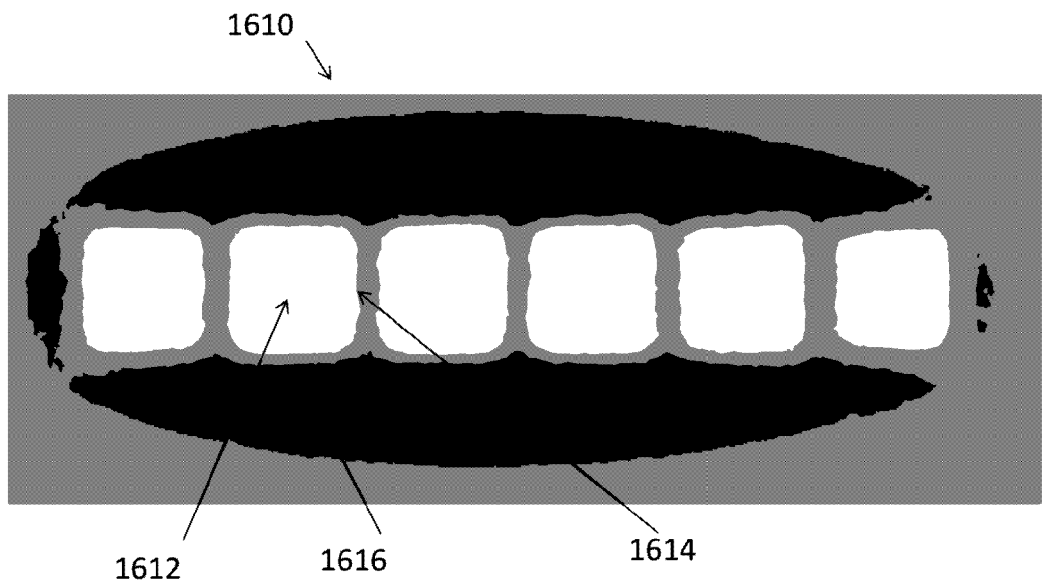
FIG. 17A illustrates a magnetic field (H-field) produced by an example embodiment arrays of resonators.
Figure 17B:
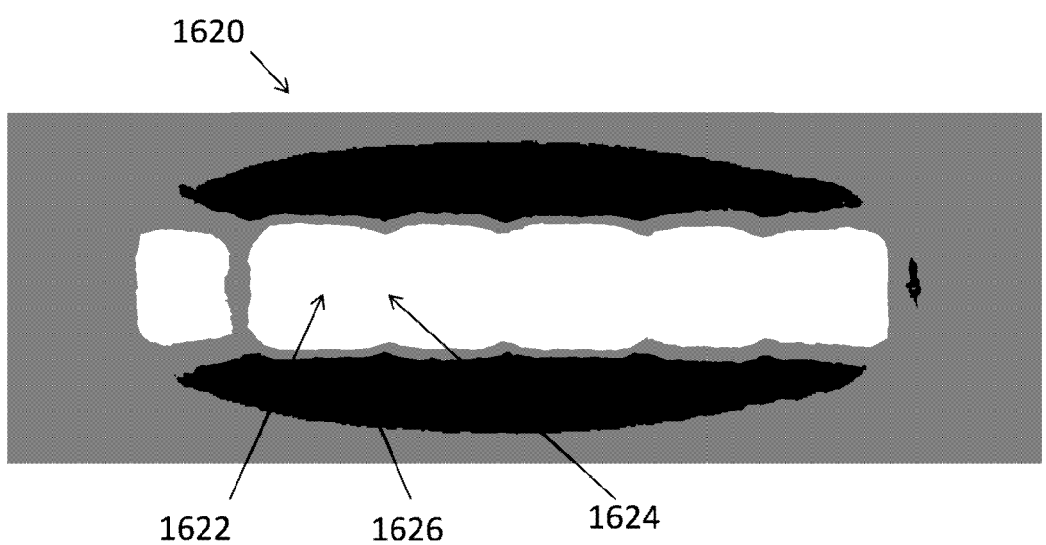
FIG. 17B illustrates a magnetic field (H-field) produced by an example embodiment arrays of resonators.

FIGS. 17A and 17B illustrate the difference in the magnetic field (H-field) produced by two different example embodiment arrays of resonators, namely that of overlapping resonators and non-overlapping resonators arranged side-by-side. The strength of the H-field is represented by 'brightness' according to a greyscale mapping (in arbitrary units, where white indicates a large positive H-field, black represents a large negative H-field, and mid-grey represents a H-field substantially equal to zero). The results depicted in FIGS. 17A and 17B are the result of a simulation. In both cases, all of the currents in resonators are in phase, and the H-field is probed at a distance of 10 mm above the array of resonators. The total end-to-end length of the six resonator chain is the same in each case.

In FIG. 17A, in the region 1604 where one resonator meets another resonator, the H-field is substantially equal to zero, meaning that approximately less power may be transferred to a receiver placed above this region. In FIG. 17B the H-field is much more uniform. In particular, in the region 1624 where one resonator overlaps another resonator, the H-field is positive and similar to the field over the centre of the resonator. This may improve the efficiency of transfer of power from the array to a receiver when receiver is not aligned with a resonator (for example, when the receiver is placed above an overlapping region.

Figure 17C:
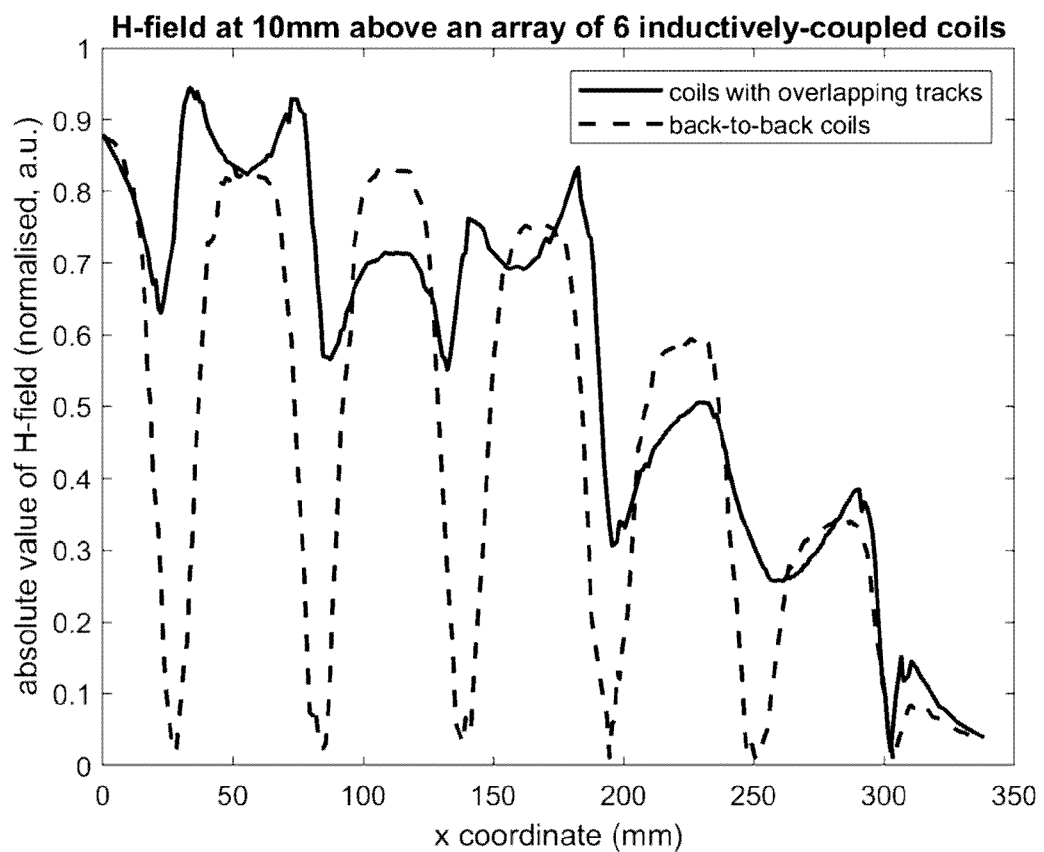
FIG. 17C illustrates 1D plots of the normalised H-fields for the array associated

FIG. 17C illustrates 1D plots of the normalised H-fields for an array of overlapping coils (FIG. 17B) and for an array of back-to-back (non-overlapping) coils (FIG. 17A). The H-field is probed at 10 mm above the array of 6 inductively coupled coils in each case to obtain the results. Normalised H-fields are used to ensure that the fields produced by the same input power are compared. The power source is disposed at the first coil at (x, y)=(0, 0). It can be seen that, for the overlapping coils, the field is much more uniform and there is less variation of several resonator lengths than for back-to back coils. For the back-to-back coils, the H-field is approximately equal to zero in regions where one resonator ends and another begins.

Although specific examples have been described, these should not be understood as limiting the scope of the invention, which should be determined with reference to the appended claims.

The invention claimed is:

1. An array of electrical resonators for wirelessly transferring power to a receiver, each of the electrical resonators comprising:
    an inductor coil comprising at least one turn comprising:
        an outer turn defining an outer coil perimeter; and
    at least one capacitor connected to the inductor coil;
    wherein the outer coil perimeter comprises:
        four major edges, wherein each major edge is substantially linear and arranged on a different edge of a quadrilateral; and
        four minor edges connecting the major edges;
the array comprising:
    a first plurality of the electrical resonators arranged in a first layer; and
    a second plurality of the electrical resonators arranged in a second layer on top of the first layer;
    wherein the minor edge of each electrical resonator substantially abuts the minor edge of an adjacent electrical resonator in the same layer, and the first and second layer together define a quadrilateral array of the electrical resonators, with a center of each inductor coil in the first layer coincident with the center of a gap region between inductor coils in the second layer;
    wherein the outer coil perimeter comprises an octagonal coil perimeter.

2. The array of claim 1, wherein the first and second layer together define a rectangular or a square array of the electrical resonators.

3. The array of claim 1, wherein each major edge of each electrical resonator of the first plurality of the electrical resonators is substantially parallel to each major edge of each electrical resonator of the second plurality of the electrical resonators.

4. The array of claim 1, wherein:
    a coil diameter is defined by the distance between opposite major edges of each resonator,
    each minor edge is the same length, and is oriented at an angle of 45° to each of the major edges connected thereto;
    an overlap is defined by a component of the length of a minor edge in the direction of a connected major edge;
    a pitch is defined by the coil diameter minus the overlap; and/or wherein a coil region, defined between an inner and outer perimeter of the coil, of each nearest neighbor in the array overlaps in the region of respective major edges of the nearest neighbors.

5. The array of claim 1, wherein at least some of the electrical resonators comprise a control element, the control element comprising a secondary resonator and an active control component that is configured to vary the electrical properties of the secondary resonator in response to a control signal; wherein the secondary resonator of each control element is inductively coupled to its respective resonator, and comprises a resonant frequency that is matched with a resonant frequency of the respective resonator; and/or the array of claim 1, wherein at least some of the electrical resonators comprise:
a switch for tuning or detuning the inductor coil of electrical resonator to or from the resonant frequency; and/or
a direct switch for providing an open-circuit condition or a short-circuit condition in the inductor coil of the electrical resonator.

6. The array of claim 1, wherein each control element of the first plurality of the electrical resonators is on an opposite side of its respective resonator compared with each of the control elements of the second plurality of the electrical resonators.

7. The array of claim 1, wherein an area of a polygon bounded by the outer coil perimeter is less than an area of the quadrilateral; and/or
wherein an area of a polygon bounded by the outer coil perimeter is greater than an area of the largest circle that fits entirely within the quadrilateral; and/or
wherein an area of a polygon bounded by the outer coil perimeter is greater than an area of the largest regular octagon that fits entirely within the quadrilateral.

8. The array of claim 1, wherein the quadrilateral is a square, wherein the distance between opposite major edges defines a coil diameter D, wherein the polygon bounded by the outer coil perimeter defines an area A; and wherein $A<D^2$; wherein $>(\pi D^2)/4$; and/or wherein $A>2(\sqrt{2}-1)D^2$.

9. The array of claim 1, wherein a perpendicular distance between a major edge and a line joining midpoints of the two minor edges adjacent to the major edge defines a midpoint depth M; wherein the plurality of concentric turns further comprises an inner turn defining an inner coil perimeter; wherein a perpendicular distance from a midpoint of a major edge to a point on the inner coil perimeter defines an effective inductor width W; and wherein W>M.

10. The array of claim 1, wherein the maximum deviation in the mutual angle between any linear sections or tangents to curved sections of a major edge is less than 10°, or less than 5°, or less than 2°, or less than 1°, or substantially 0°.

11. The array of claim 1, wherein the plurality of concentric turns further comprises an inner turn defining an inner coil perimeter; wherein the area of the polygon bounded by the outer coil perimeter is greater than the area of the polygon bounded by the inner perimeter by a factor of at least 1.1.

12. The array of claim 1, wherein a distance between a track of a first turn of the inductor coil and a track of an immediately adjacent turn of the inductor coil is between 0.05 mm and 0.5 mm.

13. The array of claim 1, wherein each minor edge comprises a curved portion.

14. The array of claim 1, wherein the plurality of concentric turns further comprises an inner turn defining an inner coil perimeter; wherein the inner coil perimeter comprises: an octagonal coil perimeter; a rounded-octagonal coil perimeter; a rounded-rectangular perimeter; a rounded-square coil perimeter; a rounded-quadrilateral perimeter; a rounded-parallelogrammatic perimeter; a truncated-circular perimeter; or a squircular perimeter.

15. The array of claim 1, wherein the minor edges are oriented at 45° to the major edges.

16. A method of arranging a plurality of electrical resonators in an array, each of the electrical resonators comprising:
an inductor coil comprising at least one turn comprising:
an outer turn defining an outer coil perimeter; and
at least one capacitor or tuning network connected to the inductor coil;
wherein the outer coil perimeter comprises:
four major edges, wherein each major edge is arranged on a different edge of a quadrilateral; and
four minor edges connecting the major edges;
the method comprising:
arranging a first plurality of the electrical resonators in a first layer; and arranging a second plurality of the electrical resonators in a second layer on top of the first layer, such that the minor edge of each electrical resonator substantially abuts the minor edge of an adjacent electrical resonator in the same layer, and the first and second layer together define a quadrilateral array of the electrical resonators, with a center of each inductor coil in the first layer coincident with the center of a gap region between inductor coils in the second layer;
wherein the outer coil perimeter comprises an octagonal coil perimeter.

* * * * *